United States Patent
Hu et al.

(10) Patent No.: US 12,425,909 B2
(45) Date of Patent: Sep. 23, 2025

(54) TARGET PRIMARY CELL (PCELL) AND PRIMARY SECONDARY CELL (PSCELL) MEASUREMENT METHOD AND APPARATUS

(71) Applicant: HUAWEI TECHNOLOGIES CO., LTD., Shenzhen (CN)

(72) Inventors: Xingxing Hu, Shanghai (CN); Hongping Zhang, Shenzhen (CN); Rui Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 17/962,998

(22) Filed: Oct. 10, 2022

(65) Prior Publication Data

US 2023/0031500 A1     Feb. 2, 2023

Related U.S. Application Data

(63) Continuation of application No. PCT/CN2021/083962, filed on Mar. 30, 2021.

(30) Foreign Application Priority Data

Apr. 10, 2020  (CN) .......................... 202010279610.5

(51) Int. Cl.
*H04W 24/10*   (2009.01)
(52) U.S. Cl.
CPC .................................. *H04W 24/10* (2013.01)
(58) Field of Classification Search
CPC ...................................................... H04W 24/10
See application file for complete search history.

(56) References Cited

U.S. PATENT DOCUMENTS

2016/0338118 A1*  11/2016  Vajapeyam .......... H04B 17/318
2018/0324624 A1*  11/2018  Gu ..................... H04W 36/0088

FOREIGN PATENT DOCUMENTS

| CN | 102026264 A | 4/2011 |
| CN | 104581854 A | 4/2015 |
| CN | 106162729 A | 11/2016 |
| CN | 110267301 A | 9/2019 |

(Continued)

OTHER PUBLICATIONS

"Support of NR-DC semi-static power control Alt1-2 in Async CA," 3GPP TSG-RAN2 Meeting #109bis-e, Electronic Meeting, R2-2003656, Total 21 pages, 3rd Generation Partnership Project, Valbonne, France (Apr. 20-30, 2020).

(Continued)

*Primary Examiner* — Natasha W Cosme
(74) *Attorney, Agent, or Firm* — Leydig, Voit & Mayer, Ltd.

(57) ABSTRACT

In a measurement method, a terminal device receives a first measurement configuration from a first network element, where the first measurement configuration indicates that the terminal device is to measure a first cell corresponding to a first frequency. The terminal device then sends a measurement report to the first network element, where the measurement report includes a first measurement result of measuring the first cell and a second measurement result of measuring a second cell corresponding to a second frequency, and the second frequency is at least one non-serving frequency different from the first frequency.

20 Claims, 8 Drawing Sheets

(56) References Cited

FOREIGN PATENT DOCUMENTS

| CN | 110475251 A | 11/2019 | |
|---|---|---|---|
| CN | 110784889 A | 2/2020 | |
| WO | 2013040921 A1 | 3/2013 | |
| WO | 2017084005 A1 | 5/2017 | |
| WO | WO-2019013543 A1 * | 1/2019 | ........ H04W 72/0426 |

OTHER PUBLICATIONS

"[108#57] Async CA (QC)—CR to 38.331 on support of async CA," 3GPP TSG RAN WG2 Meeting #109-e, E-Conference, R2-2000122, Total 8 pages, 3rd Generation Partnership Project, Valbonne, France (Feb. 24-28, 2020).

"Summary of power Control NR DC," 3GPP TSG-RAN WG2 Meeting #109 electronic, E-Meeting, R2-2002256, Total 7 pages, 3rd Generation Partnership Project, Valbonne, France (Feb. 28-Mar. 6, 2020).

"Summary of offline discussion [#35] to conclude on when NR serving cell measurements are provided," 3GPP TSG-RAN WG2 #99bis, Prague, Czech Republic, R2-171xxxx, Total 11 pages, 3rd Generation Partnership Project, Valbonne, France (Oct. 9-13, 2017).

"3rd Generation Partnership Project; Technical Specification Group Radio Access Network; NR; Physical layer procedures for control (Release 16)," 3GPP TS 38.213 V16.1.0, pp. 1-156, 3rd Generation Partnership Project, Valbonne, France (Mar. 2020).

* cited by examiner

TARGET PRIMARY CELL (PCELL) AND PRIMARY SECONDARY CELL (PSCELL) MEASUREMENT METHOD AND APPARATUS

CROSS-REFERENCE TO RELATED APPLICATIONS

This application is a continuation of International Application No. PCT/CN2021/083962, filed on Mar. 30, 2021, which claims priority to Chinese Patent Application No. 202010279610.5, filed on Apr. 10, 2020. The disclosures of the aforementioned applications are hereby incorporated by reference in their entireties.

TECHNICAL FIELD

This application relates to the communication field, and in particular, to a measurement method and apparatus.

BACKGROUND

In a wireless network, one terminal device may communicate with a plurality of access network devices via a multi-radio dual connectivity (MR-DC) technology. In the MR-DC communication, an access network device having control plane signaling exchanged with a core network is referred to as a master node (MN), and another access network device is referred to as a secondary node (SN). The MN manages a primary cell (PCell), and the SN manages a primary secondary cell (PSCell).

When the terminal device moves between cells, to ensure that a cell with better communication quality provides services for the terminal device, the MN (or the SN) may send, to the terminal device, a measurement configuration carrying a measurement frequency, to indicate the terminal device to measure signal quality of a cell corresponding to the frequency. When a reporting condition of the measurement configuration is met, the terminal device sends a measurement result to the MN (or the SN), so that a network side may indicate, based on the measurement result, the terminal device for cell (frequency) handover.

For a terminal device, frequency band combinations (band combinations) that can form MR-DC and that are supported by the terminal device are limited. In other words, the terminal device may support MR-DC over only some frequency bands but not over all frequency bands. There is a combination restriction between a PCell frequency of the MN and a PSCell frequency of the SN. If the network side needs to change the PCell frequency of the MN, the network side also needs to change the PSCell frequency of the SN to a target PSCell frequency. If the network side needs to change the PSCell frequency of the SN, the network side also needs to change the PCell frequency of the MN to a target PCell frequency. If the network side cannot obtain a measurement result of the target PSCell frequency or the target PCell frequency from the terminal device in a timely manner, a delay of handing over the PCell frequency or the PSCell frequency by the network side is increased.

SUMMARY

Embodiments of this application provide a measurement method and apparatus which reduce a delay in handing over a serving frequency of a terminal device.

According to a first aspect, a measurement method is provided, including: A terminal device receives a first measurement configuration from a first network element, where the first measurement configuration indicates the terminal device to measure a first cell corresponding to a first frequency. The terminal device sends a measurement report to the first network element, where the measurement report includes a first measurement result of measuring the first cell and a second measurement result of measuring a second cell corresponding to a second frequency, and the second frequency refers to at least one non-serving frequency different from the first frequency.

According to the measurement method provided in this embodiment of this application, the first network element sends the first measurement configuration to the terminal device. Correspondingly, the terminal device receives the first measurement configuration, where the first measurement configuration indicates the terminal device to measure the first cell corresponding to the first frequency. The terminal device sends a measurement report to the first network element. Correspondingly, the first network element receives the measurement report from the terminal device. The measurement report includes the first measurement result of measuring the first cell and the second measurement result of measuring the second cell corresponding to the second frequency, where the second frequency is at least one non-serving frequency different from the first frequency. The terminal device reports the measurement result of a cell corresponding to the non-serving frequency, so that a network side can learn communication quality of the cell corresponding to the non-serving frequency. Therefore, a delay in handing over a serving frequency of the terminal device is reduced by determining whether to hand over a PCell frequency or a PSCell frequency to a corresponding non-serving frequency.

In an example embodiment, the method further includes: The terminal device receives first indication information, where the first indication information indicates identification information of the second frequency, or the first indication information indicates information about a second measurement configuration that includes the second frequency.

In an example embodiment, the first indication information is included in the first measurement configuration.

In an example embodiment, the first measurement configuration further indicates to measure the second cell.

In an example embodiment, the first network element is a master node MN, and the second frequency is a frequency of a candidate secondary node SN; or the first network element is an SN, and the second frequency is a frequency of a candidate MN.

In an example embodiment, the terminal device supports the first frequency and the second frequency to form multi-radio dual connectivity MR-DC or carrier aggregation CA. In other words, there may be a combination restriction on the first frequency and the second frequency.

In an example embodiment, the first measurement result includes identification information of the first cell and a measurement result of the first cell, and the measurement result of the first cell is greater than a first threshold.

In an example embodiment, the second measurement result includes a cell identifier of the second cell and a measurement result of the second cell, and the measurement result of the second cell is greater than a second threshold.

In an example embodiment, that the terminal device sends the measurement report to the first network element includes: When a measurement result of the first cell is greater than a first threshold, and a measurement result of the second cell is greater than a second threshold, the terminal device sends the measurement report to the first network element. In other words, the terminal device sends the measurement report only when measurement results of the two cells are good.

In an example embodiment, the first measurement configuration includes the first threshold.

In an example embodiment, the first measurement configuration includes the second threshold.

According to a second aspect, a measurement method is provided, including: A first network element sends a first measurement configuration to a terminal device, where the first measurement configuration indicates the terminal device to measure a first cell corresponding to a first frequency. The first network element receives a measurement report from the terminal device, where the measurement report includes a first measurement result of measuring the first cell and a second measurement result of measuring a second cell corresponding to a second frequency, and the second frequency is at least one non-serving frequency different from the first frequency.

According to the measurement method provided in this embodiment of this application, the first network element sends the first measurement configuration to the terminal device. Correspondingly, the terminal device receives the first measurement configuration, where the first measurement configuration indicates the terminal device to measure the first cell corresponding to the first frequency. The terminal device sends the measurement report to the first network element. Correspondingly, the first network element receives the measurement report from the terminal device. The measurement report includes the first measurement result of measuring the first cell and the second measurement result of measuring the second cell corresponding to the second frequency, where the second frequency is at least one non-serving frequency different from the first frequency. The terminal device reports the measurement result of a cell corresponding to the non-serving frequency, so that a network side can learn communication quality of the cell corresponding to the non-serving frequency. Therefore, a delay in handing over a serving frequency of the terminal device is reduced by determining whether to hand over a PCell frequency or a PSCell frequency to a corresponding non-serving frequency.

In an example embodiment, the method further includes: The first network element sends first indication information to the terminal device, where the first indication information indicates identification information of the second frequency, or the first indication information indicates information about a second measurement configuration that includes the second frequency.

In an example embodiment, the first indication information is included in the first measurement configuration.

In an example embodiment, the first measurement configuration further indicates to measure the second cell.

In an example embodiment, the first network element is a master node MN, and the second frequency is a frequency of a candidate secondary node SN; or the first network element is an SN, and the second frequency is a frequency of a candidate MN.

In an example embodiment, the method further includes: The first network element sends the second measurement result to a second network element, where the first network element is the MN, and the second network element is the candidate MN, or the first network element is the SN, and the second network element is the MN.

In an example embodiment, the terminal device supports the first frequency and the second frequency to form multi-radio dual connectivity MR-DC or carrier aggregation CA. In other words, there may be a combination restriction on the first frequency and the second frequency.

In an example embodiment, the first measurement result includes identification information of the first cell and a measurement result of the first cell, and the measurement result of the first cell is greater than a first threshold.

In an example embodiment, the second measurement result includes a cell identifier of the second cell and a measurement result of the second cell, and the measurement result of the second cell is greater than a second threshold.

In an example embodiment, that the first network element receives the measurement report from the terminal device includes: When a measurement result of the first cell is greater than a first threshold, and a measurement result of the second cell is greater than a second threshold, the first network element receives the measurement report from the terminal device. In other words, the terminal device sends the measurement report only when measurement results of the two cells are good.

In an example embodiment, the first measurement configuration includes the first threshold.

In an example embodiment, the first measurement configuration includes the second threshold.

According to a third aspect, a timing offset sending method is provided, including: A first network element determines a first timing offset, where the first timing offset is a slot offset of a first cell managed by the first network element relative to a second cell managed by the first network element. The first network element sends the first timing offset to a second network element.

According to the timing offset sending method provided in this embodiment of this application, the first network element sends the first timing offset to the second network element, where the first timing offset is the slot offset of the first cell managed by the first network element relative to the second cell managed by the first network element. The first network element may be an MN, and the second network element may be an SN, or the first network element may be an SN, and the second network element may be an MN, so that the MN and the SN notify each other of a timing offset of the MN and a timing offset of the SN, and the MN and the SN further know a semi-persistent transmission direction configuration of each other. In this way, whether uplink transmission overlaps can be estimated, and then an uplink transmission resource can be scheduled based on maximum transmission power of the terminal device in a corresponding CG. This improves resource utilization.

In an example embodiment, the first network element is the master node MN, and the second network element is the secondary node SN; or the first network element is the SN, and the second network element is the MN.

In an example embodiment, the method further includes: The first network element sends a semi-persistent transmission direction configuration of the first cell and/or a semi-persistent transmission direction configuration of the second cell to the second network element. After obtaining a semi-persistent power sharing scheme and the semi-persistent transmission direction configuration of the first network element, the second network element can estimate whether uplink transmission of the terminal device overlaps, and schedule the terminal device based on a currently available maximum transmission power uplink scheduling. This improves resource utilization.

In an example embodiment, the first timing offset corresponds to a subcarrier spacing of the second cell.

In an example embodiment, the subcarrier spacing is a larger value of a first subcarrier spacing and a second subcarrier spacing. The first subcarrier spacing is a lowest subcarrier spacing in an uplink-downlink subcarrier spacing list in a serving cell configuration of a special serving cell in the first network element of the terminal device, and the second subcarrier spacing is a lowest subcarrier spacing in an uplink-downlink subcarrier spacing list in a serving cell configuration of a secondary serving cell in the first network element of the terminal device.

According to a fourth aspect, a configuration information sending method is provided, including: A first network element determines first serving cell configuration information, where the first serving cell configuration information is identification information of all serving cells configured by the first network element for a terminal device. The first network element sends the first serving cell configuration information to a second network element.

According to the configuration information sending method provided in this embodiment of this application, existing semi-persistent transmission directions of all cells exchanged between access network devices are used, and only identification information of serving cells configured by an MN and an SN for the terminal device needs to be exchanged, a semi-persistent transmission direction corresponding to the serving cell configured for the terminal device can be obtained. This reduces signaling exchange overhead.

In an example embodiment, the first network element is the MN, and the second network element is the SN; or the first network element is the SN, and the second network element is the MN.

In an example embodiment, the method further includes: The first network element may send semi-persistent transmission direction configuration information of all cells (including a non-serving cell of the terminal device) managed by the first network element to the second network element. The second network element may learn, based on the first serving cell configuration information and the semi-persistent transmission direction configuration information of all cells (including the non-serving cell of the terminal device) managed by the first network element, semi-persistent transmission direction configuration information of each serving cell configured by the first network element for the terminal device.

According to a fifth aspect, a communication apparatus is provided, including: a transceiver module, configured to receive a first measurement configuration from a first network element, where the first measurement configuration indicates the communication apparatus to measure a first cell corresponding to a first frequency; and the transceiver module is further configured to send a measurement report to the first network element, where the measurement report includes a first measurement result of measuring the first cell and a second measurement result of measuring a second cell corresponding to a second frequency, and the second frequency refers to at least one non-serving frequency different from the first frequency.

In an example embodiment, the transceiver module is further configured to receive first indication information, where the first indication information indicates identification information of the second frequency, or the first indication information indicates information about a second measurement configuration that includes the second frequency.

In an example embodiment, the first indication information is included in the first measurement configuration.

In an example embodiment, the first measurement configuration further indicates to measure the second cell.

In an example embodiment, the first network element is a master node MN, and the second frequency is a frequency of a candidate secondary node SN; or the first network element is an SN, and the second frequency is a frequency of a candidate MN.

In an example embodiment, the communication apparatus supports the first frequency and the second frequency to form multi-radio dual connectivity MR-DC or carrier aggregation CA.

In an example embodiment, the first measurement result includes identification information of the first cell and a measurement result of the first cell, and the measurement result of the first cell is greater than a first threshold.

In an example embodiment, the second measurement result includes a cell identifier of the second cell and a measurement result of the second cell, and the measurement result of the second cell is greater than a second threshold.

In an example embodiment, the transceiver module is specifically configured to: when a measurement result of the first cell is greater than a first threshold, and a measurement result of the second cell is greater than a second threshold, send the measurement report to the first network element.

In an example embodiment, the first measurement configuration includes the first threshold.

In an example embodiment, the first measurement configuration includes the second threshold.

According to a sixth aspect, a communication apparatus is provided, including: a transceiver module, configured to send a first measurement configuration to a terminal device, where the first measurement configuration indicates the terminal device to measure a first cell corresponding to a first frequency; and the transceiver module is further configured to receive a measurement report from the terminal device, where the measurement report includes a first measurement result of measuring the first cell and a second measurement result of measuring a second cell corresponding to a second frequency, and the second frequency refers to at least one non-serving frequency different from the first frequency.

In an example embodiment, the transceiver module is further configured to send first indication information to the terminal device, where the first indication information indicates identification information of the second frequency, or the first indication information indicates information about a second measurement configuration that includes the second frequency.

In an example embodiment, the first indication information is included in the first measurement configuration.

In an example embodiment, the first measurement configuration further indicates to measure the second cell.

In an example embodiment, the communication apparatus is a master node MN, and the second frequency is a frequency of a candidate secondary node SN; or the communication apparatus is an SN, and the second frequency is a frequency of a candidate MN.

In an example embodiment, the transceiver module is further configured to send the second measurement result to a second network element, where the communication apparatus is the MN, and the second network element is the candidate MN, or the communication apparatus is the SN, and the second network element is the MN.

In an example embodiment, the terminal device supports the first frequency and the second frequency to form multi-radio dual connectivity MR-DC or carrier aggregation CA.

In an example embodiment, the first measurement result includes identification information of the first cell and a measurement result of the first cell, and the measurement result of the first cell is greater than a first threshold.

In an example embodiment, the second measurement result includes a cell identifier of the second cell and a measurement result of the second cell, and the measurement result of the second cell is greater than a second threshold.

In an example embodiment, the transceiver module is specifically configured to: when a measurement result of the first cell is greater than a first threshold, and a measurement result of the second cell is greater than a second threshold, receive the measurement report from the terminal device.

In an example embodiment, the first measurement configuration includes the first threshold.

In an example embodiment, the first measurement configuration includes the second threshold.

According to a seventh aspect, a communication apparatus is provided, including: a processing module, configured to determine a first timing offset, where the first timing offset is a slot offset of a first cell managed by a communication apparatus relative to a second cell managed by the communication apparatus; and a transceiver module, configured to send the first timing offset to a second network element.

In an example embodiment, the communication apparatus is the master node MN, and the second network element is the secondary node SN; or the communication apparatus is the SN, and the second network element is the MN.

In an example embodiment, the transceiver module is further configured to send a semi-persistent transmission direction configuration of the first cell and/or a semi-persistent transmission direction configuration of the second cell to the second network element.

In an example embodiment, the first timing offset corresponds to a subcarrier spacing of the second cell.

In an example embodiment, the subcarrier spacing is a larger value of a first subcarrier spacing and a second subcarrier spacing. The first subcarrier spacing is a lowest subcarrier spacing in an uplink-downlink subcarrier spacing list in a serving cell configuration of a special serving cell in the communication apparatus of the terminal device, and the second subcarrier spacing is a lowest subcarrier spacing in an uplink-downlink subcarrier spacing list in a serving cell configuration of a secondary serving cell in the communication apparatus of the terminal device.

According to an eighth aspect, a communication apparatus is provided, including: a processing module, configured to determine first serving cell configuration information, where the first serving cell configuration information is identification information of all serving cells configured by the first network element for a terminal device; and a transceiver module, configured to send the first serving cell configuration information to a second network element.

In an example embodiment, the communication apparatus is an MN, and the second network element is an SN; or the communication apparatus is an SN, and the second network element is an MN.

In an example embodiment, the transceiver module is further configured to send semi-persistent transmission direction configuration information of all cells (including a non-serving cell of the terminal device) managed by the first network element to the second network element.

According to a ninth aspect, a communication apparatus is provided, including a processor, where the processor is connected to a memory, the memory is configured to store a computer program, and the processor is configured to execute the computer program stored in the memory, so that the apparatus is enabled to perform the method according to any one of the first aspect and the embodiments of the first aspect.

According to a tenth aspect, a communication apparatus is provided, including a processor, where the processor is connected to a memory, the memory is configured to store a computer program, and the processor is configured to execute the computer program stored in the memory, so that the apparatus is enabled to perform the method according to any one of the second aspect and the embodiments of the second aspect, or perform the method according to any one of the third aspect and the embodiments of the third aspect, or perform the method according to any one of the fourth aspect and the embodiments of the fourth aspect.

According to an eleventh aspect, a computer-readable storage medium is provided. The computer-readable storage medium stores a computer program, and when the computer program runs on a computer, the computer is enabled to perform the method according to any one of the first aspect and the embodiments of the first aspect.

According to a twelfth aspect, a computer-readable storage medium is provided. The computer-readable storage medium stores a computer program, and when the computer program runs on a computer, the computer is enabled to perform the method according to any one of the second aspect and the embodiments of the second aspect, or perform the method according to any one of the third aspect and the embodiments of the third aspect, or perform the method according to any one of the fourth aspect and the embodiments of the fourth aspect.

According to a thirteenth aspect, a computer program product including instructions is provided. When the instructions run on a computer or a processor, the computer or the processor is enabled to perform the method according to any one of the first aspect and the embodiments.

According to a fourteenth aspect, a computer program product including instructions is provided. When the instructions run on a computer or a processor, the computer or the processor is enabled to perform the method according to any one of the second aspect and the embodiments of the second aspect, or perform the method according to any one of the third aspect and the embodiments of the third aspect, or perform the method according to any one of the fourth aspect and the embodiments of the fourth aspect.

According to a fifteenth aspect, a communication system is provided, including the communication apparatus according to the fifth aspect and any one of the fifth aspect, and the communication apparatus according to the sixth aspect to the eighth aspect and any one of the sixth aspect to the eighth aspect; or including the communication apparatus according to the ninth aspect and the communication apparatus according to the tenth aspect.

For technical effects of the fifth aspect to the fifteenth aspect, refer to the content of the first aspect to the fourth aspect. Details are not described herein again.

DESCRIPTION OF EMBODIMENTS

Terms such as "component", "module", and "system" used in this application are used to indicate computer-related entities. The computer-related entities may be hardware, firmware, combinations of hardware and software, software, or software in running. For example, a component may be, but is not limited to, a process that is run on a processor, a processor, an object, an executable file, a thread of execution, a program, and/or a computer. As an example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate by using a local and/or remote process and according to, for example, a signal having one or more data packets (for example, data from one component, where the component interacts with another component in a local system or a distributed system, and/or interacts with other systems via a network such as the Internet by using a signal).

Embodiments of this application may be applied to a time division duplex (TDD) scenario, and may also be applied to a frequency division duplex (FDD) scenario.

Embodiments of this application are described by using a scenario of a 5th generation (5G) network in a wireless communication network. It should be noted that the solutions in embodiments of this application may be further applied to another wireless communication network, and a corresponding name may also be replaced with a name of a corresponding function in the another wireless communication network.

Figure 1:
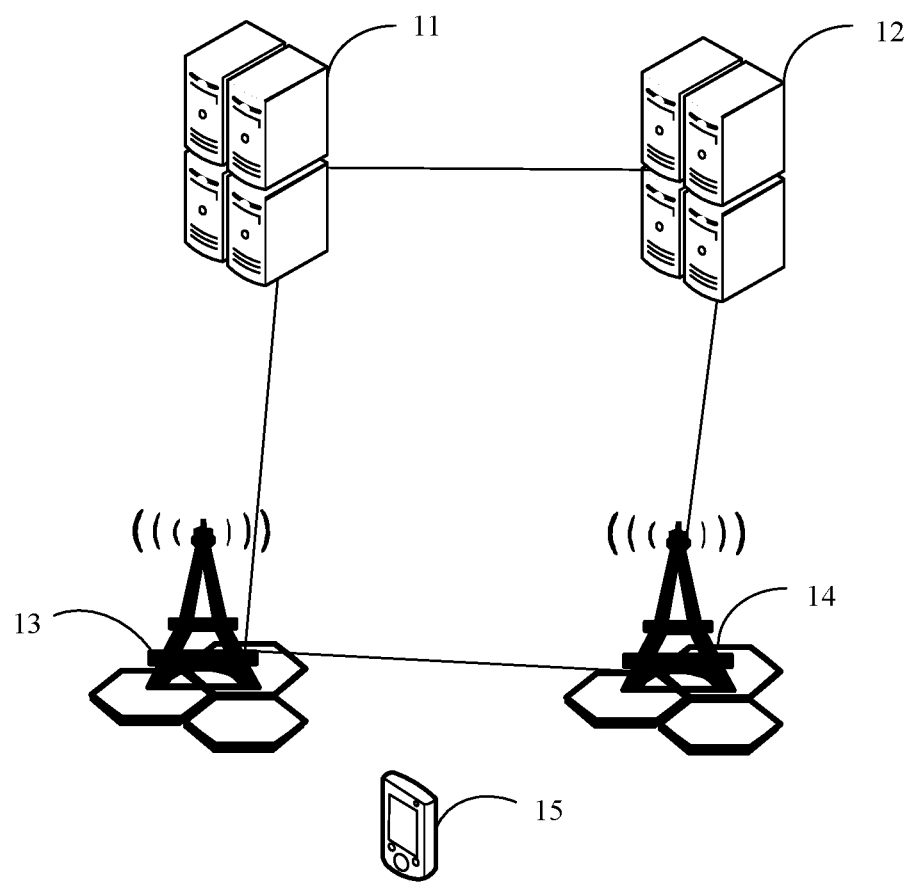
FIG. 1 is a schematic diagram of an architecture of a communication system according to an embodiment of this application.

As shown in FIG. 1, an embodiment of this application provides a communication system, including a core network device (for example, a 5th generation core (5GC) 11, and an evolved packet core (EPC) 12), an access network device (for example, a next generation NodeB (gNB) 13 and an evolved NodeB (eNB) 14), and a terminal device 15.

The terminal device is also be referred to as user equipment (UE), a mobile station (MS), a mobile terminal (MT), or the like, and is a device that provides a user with voice and/or data connectivity, for example, a handheld device or an in-vehicle device that has a wireless connection function. Currently, for example, examples of some terminal devices include a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home.

The core network device is a device in a core network (CN) that provides service support for the terminal device. Currently, some core network devices include an access and mobility management function (AMF) entity, a session management function (SMF) entity, a user plane function (UPF) entity, and the like, which are not listed one by one herein. The AMF entity may be responsible for access management and mobility management of the terminal device. The SMF entity may be responsible for session management, for example, session establishment of a user. The UPF entity may be a user plane functional entity, and is mainly responsible for connecting to an external network. It should be noted that an entity in this application may also be referred to as a network element or a functional entity. For example, the AMF entity may also be referred to as an AMF network element or an AMF functional entity, and the SMF entity may also be referred to as an SMF network element or an SMF functional entity.

The access network device is a radio access network (RAN) node (or device) that connects the terminal device to a wireless network, and may also be referred to as a base station. Currently, examples of some RAN nodes include a gNB, an eNB, a transmission reception point (TRP), a radio network controller (RNC), a NodeB (NB), a base station controller (BSC), a base transceiver station (BTS), a home base station (for example, a home evolved NodeB, or a home NodeB, HNB), a base band unit (BBU), a wireless fidelity (Wi-Fi) access point (AP), or the like. In addition, in a network structure, the access network device may include a centralized unit (CU), a distributed unit (DU), or a RAN device including a CU and a DU. The RAN device including a CU and a DU splits protocol layers from a perspective of logical functions. Some functions of the protocol layers are centrally controlled by the CU, and some or all remaining functions of the protocol layers are distributed in the DU, and the CU centrally controls the DU.

Figure 2:
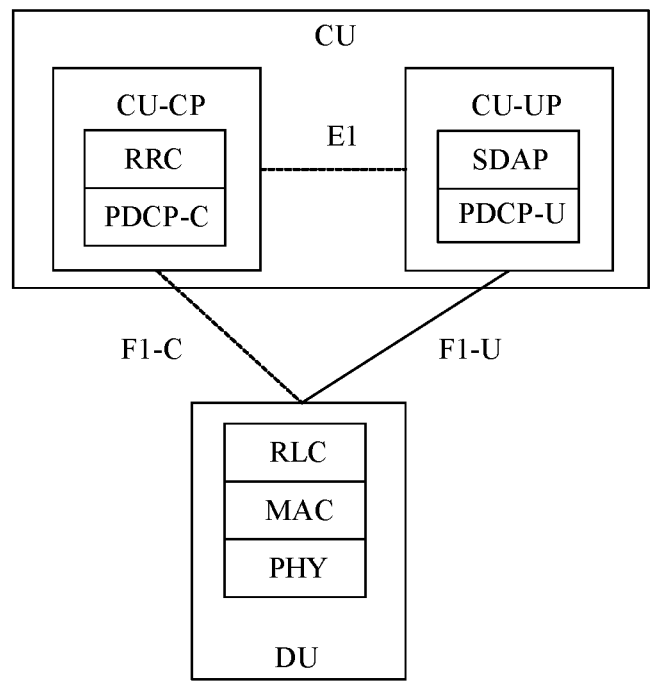
FIG. 2 is a schematic diagram of an architecture of a CU-DU according to an embodiment of this application.

FIG. 2 is a schematic diagram of an architecture of a CU-DU. The CU and the DU may be physically separated or deployed together. The CU and the DU may be divided based on a protocol layer. For example, in an example division manner, the CU is configured to perform functions of a radio resource control (RRC) layer, a service data adaptation protocol (SDAP) layer (where this protocol layer is a protocol layer available only when the access network device is connected to a 5G core network), and a packet data convergence protocol (PDCP) layer, and the DU is configured to perform functions of a radio link control (RLC) layer, a medium access control (MAC) layer, a physical (PHY) layer, and the like.

It may be understood that the foregoing division is merely an example, and the CU and the DU may alternatively be divided in another manner. For example, the CU or the DU may have functions of more protocol layers through division. For example, the CU or the DU may alternatively have some processing functions of the protocol layers through division.

In an example embodiment, some functions of an RLC layer and a function of a protocol layer above the RLC layer are set on the CU, and a remaining function of the RLC layer and a function of a protocol layer below the RLC layer are set on the DU.

In another example embodiment, functions of the CU or the DU may alternatively be classified based on a service type or another system requirement. For example, division is performed based on a latency, a function whose processing time needs to satisfy a latency requirement is disposed on the DU, and a function whose processing time does not need to satisfy the latency requirement is disposed on the CU.

In still another example embodiment, the CU may alternatively have one or more functions of a core network. One or more CUs may be disposed together or separately. For example, the CUs may be disposed on a network side for ease of centralized management. The DU may have a plurality of radio frequency functions, or the radio frequency functions may be disposed remotely.

It should be understood that functions of the CU and the DU may be set based on a requirement during specific implementation. This is not limited in embodiments of this application. Functions of the CU may be implemented by one entity, or may be implemented by different functional entities. In a manner, functions of the CU may be further divided into a control plane (CP) function and a user plane (user plane, UP), that is, the CU may be divided into a CU-UP and a CU-CP. The CU-CP and the CU-UP may be implemented by different functional entities, or may be implemented by a same functional entity. The CU-CP and the CU-UP may be coupled to the DU, to jointly complete functions of the access network device. In an example manner, the CU-CP is responsible for control plane functions, and mainly includes an RRC and a PDCP-C. The PDCP-C is mainly responsible for encryption, decryption, integrity protection, data transmission, and the like of control plane data. The CU-UP is responsible for user plane functions, and mainly includes an SDAP and a PDCP-U. The SDAP is mainly responsible for processing data of the core network device and mapping a data flow (flow) to a bearer. The PDCP-U is mainly responsible for encryption, decryption, integrity protection, header compression, serial number maintenance, data transmission, and the like on a data plane. In another example embodiment, the PDCP-C is also included in the CU-UP.

The core network device may communicate with the CU (for example, the CU-UP and/or the CU-CP). For example, the CU-CP may communicate with the core network device through an Ng interface on behalf of the access network device. The CU-UP and the CU-CP may communicate with each other, for example, through an E1 interface. Communication may be performed between the CU-UP and the DU and between the CU-CP and the DU. For example, the CU-CP may communicate with the DU via F1-C (control plane), and the CU-UP may communicate with the DU via F1-U (user plane). A plurality of DUs may share one CU, or one DU may be connected to a plurality of CUs. The CU and the DU may communicate with each other through an interface (for example, an F1 interface).

In this embodiment of this application, one terminal device may communicate with a plurality of access network devices via MR-DC. In MR-DC, a base station that has control plane signaling interaction with a core network is referred to as an MN, and another base station is referred to as an SN. The MN includes a master cell group (MCG). The MCG includes at least one PCell, and may further include at least one secondary cell (SCell). All these cells are referred to as MCG serving cells of the terminal device. The SN includes a secondary cell group (SCG). The SCG includes at least one PSCell, and may further include at least one SCell. All these cells are referred to as SCG serving cells of the terminal device. Both the MCG serving cell and the SCG serving cell of the terminal device are referred to as serving cells of the terminal device. A frequency corresponding to each cell in the MCG is referred to as an MCG serving frequency (which may also be referred to as an MN serving frequency) of the terminal device. A frequency corresponding to each cell in the SCG is referred to as an SCG serving frequency (which may also be referred to as an SN serving frequency) of the terminal device. These frequencies are all referred to as serving frequencies of the terminal device.

The PCell is a cell that is deployed at a primary frequency and in which the terminal device initiates an initial connection establishment process or initiates a connection reestablishment process in the cell, or that is indicated as a primary cell in a handover process. The PSCell is a cell in which the terminal device initiates a random access process in the SN, or a cell in which the terminal device skips a random access process in an SN change process and initiates data transmission, or a cell of the SN in which the terminal device initiates random access in a synchronous reconfiguration process.

It should be noted that the PCell in this application further includes a cell in which the terminal device initiates an initial connection establishment process or initiates a connection reestablishment process when MR-DC is not configured, or a cell that is indicated as a primary cell in a handover process. In this application, for unified description, a base station connected to the terminal device when MR-DC is not configured is also referred to as the MN.

For one terminal device, a plurality of access network devices forming MR-DC may belong to a same radio access technology (RAT), for example, all belong to an evolved universal terrestrial radio access (E-UTRA) technology in a 4th generation (4G) communication technology, or all belong to a new radio (NR) access technology in 5G. The plurality of access network devices forming MR-DC may also belong to different RATs. For example, one belongs to E-UTRA, and the other belongs to NR. A network side may provide a communication service for the terminal device using resources of the plurality of access network devices, to provide a high transmission rate for the terminal device.

Based on different radio access technologies, MR-DC includes, for example, evolved universal terrestrial radio access and new radio dual connectivity (E-UTRA-NR dual connectivity, EN-DC), evolved universal terrestrial radio access and new radio dual connectivity (NG-RAN E-UTRA-NR dual connectivity, NGEN-DC) of a next-generation radio access node, new radio and evolved universal terrestrial radio access dual connectivity (NR-E-UTRA dual connectivity, NE-DC), and new radio and new radio dual connectivity (NR-NR dual connectivity, NR-DC).

The MN in EN-DC is a long term evolution (LTE) connected to a 4G core network EPC, that is, a base station eNB of the EPC, and the SN is an NR base station. EN-DC is sometimes referred to as non-standalone (NSA) networking, because in an initial phase of 5G, a terminal device in an EN-DC network cannot camp on an NR cell. An NR base station that can camp on a terminal device is sometimes referred to as a standalone (SA) NR base station. In addition, for MR-DC, the terminal device reports MR-DC of which frequency bands are supported for combination (referred to as band combination in the protocol). In other words, the terminal device may support MR-DC of only some frequency bands, and does not support MR-DC of all frequency bands. The network side configures MR-DC for the terminal device only based on a capability of the terminal device, and configures MR-DC corresponding to only frequency bands supported by the terminal device.

In NGEN-DC, the MN is an LTE base station ng-eNB connected to a 5G core network 5GC, and the SN is an NR base station.

In NE-DC, the MN is an NR base station connected to the 5G core network 5GC, and the SN is an LTE base station.

In NR-DC, the MN is an NR base station connected to the 5G core network 5GC, and the SN is an NR base station.

For an MR-DC terminal device, a user plane of the SN may be connected to a core network connected to the MN, that is, the core network may directly send data to the terminal device via the SN.

The access network devices have different RLC/MAC entities. A data radio bearer (DRB) in MR-DC includes an MCG bearer, an SCG bearer, and a split bearer. The MCG bearer is that an RLC/MAC entity of the DRB is only on the MN. The SCG bearer is that the RLC/MAC entity of the DRB is only on the SN. The split bearer is that the RLC/MAC entity of the DRB exists on both the MN and the SN.

For a bearer whose PDCP terminates on the MN, that is, a bearer terminated on the MN (MN terminated bearer), downlink data directly arrives at the MN from the core network, is processed by a PDCP/SDAP of the MN, and then is sent to the terminal device via the RLC/MAC. Uplink data is processed by the PDCP/SDAP of the MN and then sent to the core network. Similarly, for a bearer whose PDCP terminates on the SN, that is, a bearer terminated on the SN (SN terminated bearer), the downlink data directly arrives at the SN from the core network, is processed by a PDCP/SDAP of the SN, and then is sent to the terminal device via the RLC/MAC. The uplink data is processed by the PDCP/SDAP of the SN and then sent to the core network.

Figure 3:
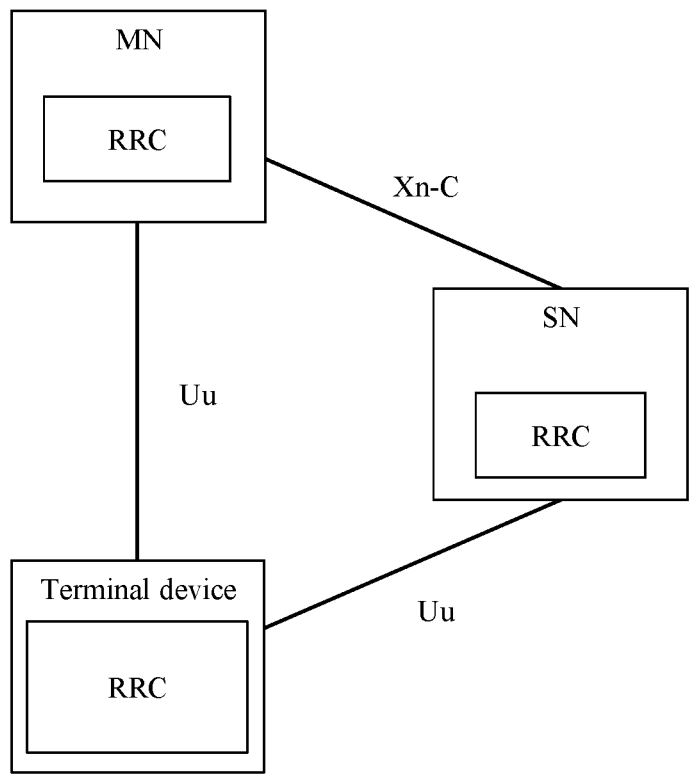
FIG. 3 is a schematic diagram of transferring an RRC message between a terminal device, an MN, and an SN according to an embodiment of this application.

As shown in FIG. 3, in MR-DC, both the MN and the SN have an RRC entity, and both can generate an RRC message (that is, a control message, including, for example, a measurement configuration). The SN may directly send, to the terminal device through a Uu interface, an RRC message generated by the SN. In this case, the terminal device also directly sends the RRC message to the SN through the Uu interface. The RRC message directly sent between the SN and the terminal device is transmitted via a signaling radio bearer 3 (SRB 3). The SRB 3 is a signaling radio bearer configured by the SN for the terminal device. For a measurement configuration sent by the SN to the terminal device, if there is no SRB 3, the SN may generate an RRC message including the measurement configuration, and send the RRC message to the MN through an interface (for example, an Xn-C interface) between the MN and the SN. The MN encapsulates the RRC message into the RRC message of the MN, and sends the RRC message to the terminal device through the Uu interface. The terminal device may generate an RRC message including a measurement result, and send the RRC message to the MN through the Uu interface. The MN encapsulates the RRC message into the RRC message of the MN, and sends the RRC message to the SN through the Uu interface.

It should be noted that when the terminal device sends a measurement result of the MN service frequency to the MN in response to the measurement configuration from the MN, a measurement result of the SN service frequency may be further carried. For example, the measurement result of the MN service frequency and the measurement result of the SN service frequency are carried in a same measurement report or different measurement reports.

As described above, when the terminal device moves between cells, to ensure that a cell with good signal quality provides a service for the terminal device, for example, a neighboring cell whose reference signal received power (RSRP) or reference signal received quality (RSRQ) is higher than a specified threshold of the current cell is selected to provide a service for the terminal device, the MN (or the SN) may send a measurement configuration to the terminal device, where the measurement configuration carries one measurement frequency, and indicates the terminal device to measure signal quality of a cell corresponding to the frequency. When a reporting condition of the measurement configuration is met, the terminal device sends the measurement result to the MN (or the SN), so that the network side may indicate, based on the measurement result, the terminal device to hand over the frequency, or indicate the terminal device to hand over to a neighboring cell corresponding to the frequency.

Generally, the measurement configuration includes the following content:

Measurement object: The measurement object includes a measurement frequency, and the like. For NR, the measurement object may be a frequency corresponding to a synchronization signal block (SSB) or a frequency corresponding to a channel state information reference signal (CSI-RS). For NR, the measurement object may further include how to obtain signal quality of each cell in the measurement frequency. For example, the signal quality of the cells is deduced using signal quality of several beams, and conditions that the signal quality of these beams should meet. Each measurement object has an identifier which called a measurement object identifier (measObjectID).

Report configuration: The report configuration includes configurations of report types. The report types include an event report or a periodic report. An event report configuration includes configurations of event reports such as A1, A2, A3, A4, A5, A6, B1 and B2. A periodic report configuration includes a reporting interval, a quantity of reporting times, a reporting amount, and the like. Each report configuration has an identifier, which referred to as a report configuration identifier (reportConfigID). Ax (that is, A1/A2/A3/A4/A5/A6) is referred to as intra-radio access technology measurement. B1/B2 is referred to as inter-radio access technology measurement.

Measurement identifier configuration: The measurement identifier configuration includes a measurement identifier (measID), a measurement object identifier (measObjectID) corresponding to the measurement identifier, and a report configuration identifier (reportConfigID).

An event A1 is that signal quality of a serving cell is higher than a specified threshold. The serving cell is a serving cell corresponding to a measurement frequency in a measurement object corresponding to the event A1.

An event A2 is that signal quality of a serving cell is lower than a specified threshold. The serving cell is a serving cell corresponding to a measurement frequency in a measurement object corresponding to the event A2.

An event A3 is that signal quality of a neighboring cell is higher than that of the PCell or PSCell by a specified threshold. An event A3 configuration may also indicate whether the signal quality of the PCell or PSCell is compared. That is, the signal quality of the neighboring cell is higher than that of the PCell or PSCell by a specified threshold. The neighboring cell is a cell corresponding to a measurement frequency in a measurement object corresponding to the event A3. The frequency may be different from that used by the PCell and PSCell. In NR, a measurement reference signal indicated in the measurement object corresponding to the event may be a reference signal indicated by a measurement object corresponding to a PSCell in the NR.

An event A4 is that signal quality of a neighboring cell is higher than a specified threshold. The neighboring cell is a cell corresponding to a measurement frequency in a measurement object corresponding to the event A4.

An event A5 is that signal quality of the PCell or PSCell is lower than a threshold 1 and signal quality of a neighboring cell is higher than a threshold 2. An event A5 configuration may also indicate whether to compare the signal quality of the PCell or PSCell. The neighboring cell is a cell corresponding to a measurement frequency in a measurement object corresponding to the event A5. The frequency may be different from that used by the PCell and PSCell. In NR, a measurement reference signal indicated in the measurement object corresponding to the event may be a reference signal indicated by a measurement object corresponding to an SpCell in the NR.

An event A6 is that signal quality of a neighboring cell is higher than that of an SCell by a specified threshold. The SCell cell and the neighboring cell are cells corresponding to a measurement frequency in a measurement object corresponding to the event A6. In NR, the SCell corresponding to the event and the reference signal corresponding to the neighboring cell are measurement reference signals indicated in the measurement object corresponding to the event.

An event B1 is that signal quality of a neighboring cell of another wireless communication standard is higher than a specified threshold. The neighboring cell is a cell corresponding to a measurement frequency in a measurement object corresponding to the event B1.

An event B2 is that signal quality of a PCell is lower than a threshold 3 and signal quality of a neighboring cell of the another wireless communication standard is higher than a threshold 4. The neighboring cell is a cell corresponding to a measurement frequency in a measurement object corresponding to the event B2.

When the MN configures the A3/A4/A5/B1/B2 event for the terminal device, and when the terminal device reports measurement results of these events, the terminal device may further carry the measurement result of the SN serving frequency, and may carry a measurement result of a beam of each reported cell. The beam is a reference signal in a specified spatial range, and a type of the reference signal may be an SSB or a CSI-RS. The measurement result of the SN serving frequency includes measurement results of a serving cell and a neighboring cell corresponding to the SN serving frequency. Therefore, the measurement result sent by the terminal device does not include a measurement result of a neighboring cell on a non-serving frequency.

There is a combination restriction on a PCell frequency of the MN and a PSCell frequency of the SN. For example, the terminal device supports MR-DC formed by a frequency band 1 and a frequency band 2 (for example, the PCell frequency belongs to the frequency band 1, and the PSCell frequency belongs to the frequency band 2), and supports MR-DC formed by a frequency band 3 and a frequency band 4 (for example, the PCell frequency belongs to the frequency band 3, and the PSCell frequency belongs to the frequency band 4), but does not support MR-DC formed by the frequency band 1 and the frequency band 4. In other words, it may be considered that the PCell frequency of the MN corresponds to the PSCell frequency of the SN.

In some scenarios, when the PCell frequency of the MN changes (for example, handover from a first PCell to a second PCell), the PSCell frequency of the SN also needs to be changed. Alternatively, the network side has not configured MR-DC for the terminal device currently, and needs to configure MR-DC for the terminal device. The network side may change a PCell frequency and configure the PSCell frequency. However, a new PSCell frequency or a changed PSCell frequency does not belong to a current serving frequency of the terminal device, and the terminal device has not reported a measurement result of a cell corresponding to the frequency. The network side can complete the foregoing process only after the terminal device subsequently reports the measurement result of the cell corresponding to the frequency for another measurement configuration, this increases a delay in configuring a frequency on the network side.

For example, in the foregoing second scenario, the network side cannot immediately configure MR-DC for the terminal device, and can configure MR-DC for the terminal device only after the terminal device subsequently reports the measurement result of the cell corresponding to the new PSCell frequency. This increases a delay in configuring MR-DC.

Figure 4:
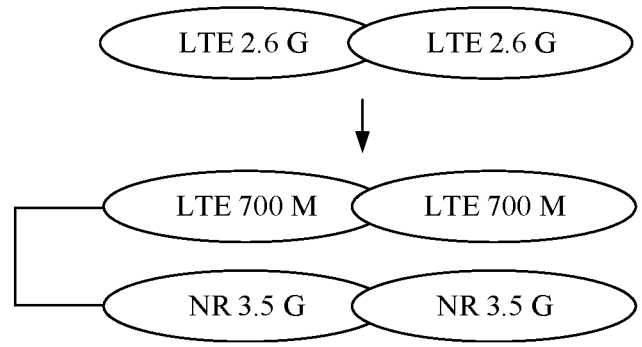
FIG. 4 is a schematic diagram of frequency handing over performed by a terminal device according to an embodiment of this application.

For example, as shown in FIG. 4, the terminal device supports only MR-DC of E-UTRA 700 M (that is, a 700 M frequency band of the E-UTRA standard)+NR 3.5 G (that is, a 3.5 G frequency band of the NR standard), and does not support MR-DC of E-UTRA 2.6 G (that is, a 2.6 G frequency band of the E-UTRA standard)+NR 3.5 G (that is, the 3.5 G frequency band of the NR standard), a current PCell of the terminal device is a cell whose frequency is located in E-UTRA 2.6 G. 700 M/2.6 G/3.5 G/2.1 G/1.8 G in this application is a frequency that belongs to a frequency band range corresponding to 700 M/2.6 G/3.5 G/2.1 G/1.8 G.

To enable the terminal device to use MR-DC, the network side first hands over the PCell frequency of the terminal device to E-UTRA 700 M, and then configures MR-DC. The network side delivers, at E-UTRA 2.6 G, a measurement configuration specific to a frequency of E-UTRA 700 M to the terminal device. When the terminal device reports a measurement result, only a measurement result of a cell corresponding to the frequency of E-UTRA 700 M is carried, and a measurement result of a cell corresponding to a frequency of NR 3.5 G is not carried. Therefore, when the terminal device is handed over from E-UTRA 2.6 G to E-UTRA 700 M, the network side cannot immediately configure an NR 3.5 G base station as an SN for the terminal device.

After the terminal device is handed over to E-UTRA 700 M, the network side needs to deliver, to the terminal device, a measurement configuration for a cell corresponding to the frequency of NR 3.5G, and then configure MR-DC based on a measurement result. This increases the delay in configuring MR-DC. Alternatively, the network side configures two measurement objects for the terminal device, which respectively correspond to the frequency of E-UTRA 700 M and the frequency of NR 3.5 G. After the terminal device reports, via two measurement report messages, measurement results of cells corresponding to the frequency of E-UTRA 700 M and the frequency of NR 3.5 G, the terminal device determines to hand over the terminal device to E-UTRA 700 M. In addition, a PSCell corresponding to NR 3.5 G is configured for the terminal device (for example, the network side determines, based on the two measurement results, that signal quality of both E-UTRA 700 M and NR 3.5 G measured by the terminal device are good). This brings the following problems: The network side receives, at different times, the measurement results of the cells corresponding to the frequency of NR 3.5 G and the frequency of E-UTRA 700 M, and the network side changes the PCell frequency and the PSCell frequency accordingly. When the network side configures MR-DC for the terminal device based on the two measurement results, actual communication quality corresponding to a frequency of a frequency band (for example, E-UTRA 700 M) that is first reported has deteriorated. In other words, a previous measurement result has become invalid. As a result, the terminal device fails to access the new PCell frequency, and service communication is interrupted. In addition, the network side needs to store the previous measurement result, which accordingly increases complexity of the network side.

In some other scenarios, when the frequency of the PSCell of the SN changes, the frequency of the PCell of the corresponding MN also needs to change. If the measurement result of the cell corresponding to the new PSCell frequency is better and the measurement result of the cell corresponding to the current PSCell frequency is worse, the network side changes the PSCell frequency. However, in the measurement result of the cell corresponding to the new PSCell frequency received by the network side, the measurement result of the cell corresponding to the new PCell frequency is not carried. Therefore, the PSCell frequency cannot be changed on the network side.

Figure 5:
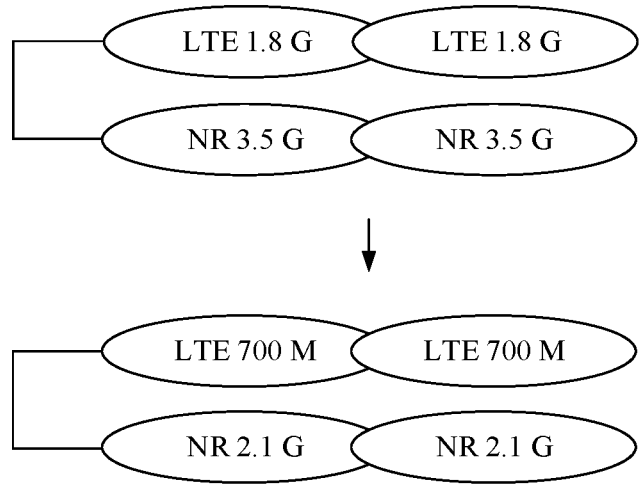
FIG. 5 is a schematic diagram of another frequency handing over performed by a terminal device according to an embodiment of this application.

For example, as shown in FIG. 5, the terminal device supports only E-UTRA 1.8 G+NR 3.5 G and E-UTRA 700 M+NR 2.1 G. It is assumed that the currently configured MR-DC of the terminal device is E-UTRA 1.8 G+NR 3.5 G, the PCell frequency is located in E-UTRA 1.8 G, and the PSCell frequency is located in NR 3.5 G. When the PSCell frequency of NR 3.5 G needs to be changed (for example, NR 3.5 G non-contiguous coverage), the PCell frequency of E-UTRA 1.8 G also needs to be changed.

Because the network side does not know the measurement result of the cell corresponding to the frequency of E-UTRA 700 M, the network side cannot determine to hand over the PCell frequency to E-UTRA 700 M. Therefore, the network side first releases the PSCell frequency, and triggers the terminal device to hand over the PCell frequency to E-UTRA 700 M, then, a measurement configuration for the frequency of NR 2.1 G is delivered to the terminal device, and then the NR 2.1 G base station is configured as the SN based on the measurement result. This causes an extra delay.

Alternatively, the network side configures two measurement objects for the terminal device, which respectively correspond to the frequency of E-UTRA 700 M and the frequency of NR 2.1 G. After the terminal device reports, via two measurement report messages, measurement results of cells corresponding to the frequency of E-UTRA 700 M and the frequency of NR 2.1 G, the terminal device determines to hand over the terminal device to E-UTRA 700 M. In addition, a PSCell corresponding to NR 2.1 G is configured for the terminal device (for example, the network side determines, based on the two measurement results, that signal quality of both E-UTRA 700 M and NR 2.1 G measured by the terminal device are good). This brings the following problems: The network side receives, at different times, the measurement results of the cells corresponding to the frequency of NR 2.1 G and the frequency of E-UTRA 700 M, and the network side changes the PCell frequency and the PSCell frequency accordingly. When the network side configures MR-DC for the terminal device based on the two measurement results, actual communication quality corresponding to a frequency of a frequency band (for example, E-UTRA 700 M) that is first reported has deteriorated. In other words, a previous measurement result has become invalid. As a result, the terminal device may fail to access the new PCell frequency, and service communication is interrupted. In addition, the network side needs to store the previous measurement result, which accordingly increases complexity of the network side.

An embodiment of this application provides a measurement method. When a terminal device is in an MR-DC scenario and a network side needs to change a PCell frequency (or a PSCell frequency), the network side indicates the terminal device to report a measurement result of a cell corresponding to a target PCell frequency (or a target PSCell frequency). The terminal device reports, based on the indication, the measurement result of the cell corresponding to the target PCell frequency (or the target PSCell frequency), and also reports, based on a principle that there is a combination restriction on the PCell frequency and the PSCell frequency, a measurement result of a cell corresponding to a candidate PSCell frequency (or a candidate PCell frequency) that meets the combination restriction with the target PCell frequency (or the target PSCell frequency). In this way, the network side can learn communication quality of the cell corresponding to the candidate PSCell frequency (or the candidate PCell frequency), determine whether to hand over the PCell frequency (or the PSCell frequency) to the target PCell frequency (or the target PSCell frequency), and hand over the PSCell frequency (or the PCell frequency) to the candidate PSCell frequency (or the candidate PCell frequency). When the terminal device is in a CA scenario and the network side needs to change a PCell frequency, the network side indicates the terminal device to report a measurement result of a cell corresponding to a target PCell frequency. The terminal device reports, based on the indication, the measurement result of the cell corresponding to the target PCell frequency, and also reports, based on a principle that there is a combination restriction on the PCell frequency and an SCell frequency in an MCG, a measurement result of a cell corresponding to a candidate SCell frequency that meets the combination restriction with the target PCell frequency. In this way, the network side can learn communication quality of the cell corresponding to the candidate S Cell frequency, determine whether to hand over the PCell frequency to the target PCell frequency, and hand over the SCell frequency to the candidate SCell frequency.

The measurement method may be applied to the following scenarios:

Scenario 1: As there is a combination restriction on a PCell frequency of an MN and a PSCell frequency of an SN, when the network side hands over a source PCell frequency of a source MN to a target PCell frequency of a target MN (in this case, the target PCell frequency is a non-serving frequency), a source PSCell frequency of a source SN needs to be handed over to a target PSCell frequency of a target SN (in this case, the target PSCell frequency is a non-serving frequency). When the source SN and the target SN are not a same SN, the SN needs to be handed over. When the source MN and the target MN are not a same MN, the MN needs to be handed over. In this case, the terminal device not only needs to report a measurement result of a cell corresponding to the target PCell frequency of the target MN, but also needs to report a measurement result of a cell corresponding to the target PSCell frequency of the target SN, so that the network side completes a handover process. Alternatively, a current network side does not configure MR-DC for the terminal device, and a PCell frequency of the current terminal device cannot form MR-DC with another frequency. If the network side wants to configure MR-DC for the terminal device, the network side needs to first hand over the PCell frequency to the target PCell frequency, and then configure MR-DC for the terminal device.

Scenario 2: When the network side hands over the source PSCell frequency of the source SN to the target PSCell frequency of the target SN (in this case, the target PSCell frequency is a non-serving frequency), the source PCell frequency of the source MN needs to be handed over to the target PCell frequency of the target MN (in this case, the target PCell frequency is a non-serving frequency). When the source SN and the target SN are not a same SN, the SN needs to be handed over. When the source MN and the target MN are not a same MN, the MN needs to be handed over. In this case, the terminal device not only needs to report a measurement result of a cell corresponding to the target PSCell frequency of the target SN, but also needs to report a measurement result of a cell corresponding to the target PCell frequency of the target MN, so that the network side completes the handover process.

Scenario 3: In CA, one PCell frequency corresponds to at least one SCell frequency, and the PCell frequency and the SCell frequency are co-sited. When the network side hands over the source PCell frequency of the source MN to the target PCell frequency of the target MN (in this case, the target PCell frequency is a non-serving frequency), no matter whether the source MN and the target MN are a same MN, because the PCell frequency has changed, the SCell frequency needs to be added or changed. In this case, the terminal device not only needs to report a measurement report of a cell corresponding to the target PCell frequency of the target MN, but also needs to report a measurement result of a cell corresponding to the target SCell frequency of the target SN (in this case, the target SCell frequency is a non-serving frequency), so that the network side completes a CA configuration process.

Figure 6:
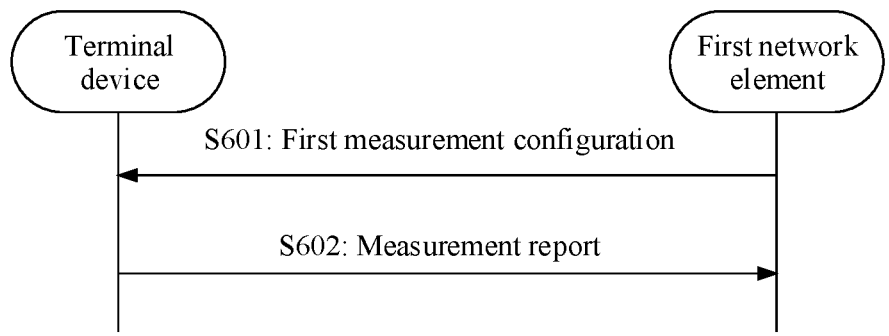
FIG. 6 is a schematic flowchart of a measurement method according to an embodiment of this application.

Specifically, as shown in FIG. 6, the measurement method includes the following steps.

S601: A first network element sends a first measurement configuration to a terminal device.

Correspondingly, the terminal device receives the first measurement configuration from the first network element.

The first measurement configuration indicates the terminal device to measure a first cell corresponding to a first frequency. For the foregoing content of the measurement configuration, a measurement object in the first measurement configuration includes a first frequency, and a report configuration of the first measurement configuration may be an event report or a periodic report. A type of an event is not limited in this application. For example, the event may be an A3/A4/A5 event, a B1/B2 event, or another event. The first frequency is described in detail later in this step.

The first network element may be an MN or an SN. In other words, when the first network element is the MN, the MN may send an RRC message to the terminal device, where the RRC message includes a first measurement configuration from the MN. Alternatively, when the first network element is the SN, if there is no SRB 3 between the SN and the terminal device, the SN may send an RRC message including the first measurement configuration to the MN, and the MN encapsulates the RRC message into an RRC message of the MN, and sends the RRC message to the terminal device. In other words, the first measurement configuration is from the SN. Alternatively, when the first network element is the SN, and there is an SRB 3 between the SN and the terminal device, the SN may directly send an RRC message to the terminal device, where the RRC message includes a first measurement configuration from the SN.

The first network element may further indicate the terminal device to measure a second cell corresponding to a second frequency, or indicate the terminal device to report a measurement result of a second cell corresponding to a second frequency. The second frequency is at least one non-serving frequency different from the first frequency. In this embodiment of this application, the non-serving frequency is neither a serving frequency of the MN nor a serving frequency of the SN. That is, the non-serving frequency is not a serving frequency configured by the network side (the MN and the SN) for the terminal device, and currently, the network side does not provide a communication service for the terminal device via a cell corresponding to the non-serving frequency.

Specific indication manners may include the following several types:

In an example embodiment, the first measurement configuration further indicates the terminal device to measure the cell corresponding to the second frequency. For example, the measurement object in the first measurement configuration includes both the first frequency and the second frequency.

In another example embodiment, the first network element may further send first indication information to the terminal device. Correspondingly, the terminal device receives the first indication information from the first network element.

The first indication information may indicate identification information of the second frequency. In other words, the second frequency is directly indicated by the identification information.

Alternatively, the first indication information indicates information about a second measurement configuration that includes the second frequency, and the second measurement configuration is a measurement configuration received by the terminal device before the terminal device receives the first indication information. The terminal device may determine the second measurement configuration based on the first indication information, to determine the second frequency in the second measurement configuration. The information about the second measurement configuration includes, for example, a report configuration identifier (reportConfigID), a measurement object identifier (measObjectID), or a measurement identifier (measID) of the second measurement configuration.

Alternatively, the first indication information indicates identification information of a network element for which a third measurement configuration including the second frequency is configured. The third measurement configuration is a measurement configuration received by the terminal device before the terminal device receives the first indication information. In other words, the first indication information indicates an access network device for which the third measurement configuration including the second frequency is configured. The terminal device may determine the third measurement configuration based on the identification information of the network element, to determine the second frequency in the third measurement configuration. For example, when the first network element is the MN, and the first indication information indicates identification information of the SN, the second frequency is all non-serving frequencies in a measurement configuration configured by the SN for the terminal device. The SN configures the third measurement configuration for the terminal device, a measurement frequency corresponding to a measurement object in the third measurement configuration is the second frequency.

It should be noted that the first indication information may be included in the first measurement configuration. Alternatively, the first network element may separately send the first indication information to the terminal device.

The second measurement configuration or the third measurement configuration is a measurement configuration received by the terminal device before the terminal device receives the first indication information. If the network side does not indicate, using the measurement configuration, the terminal device to measure a cell corresponding to a specific measurement frequency, the terminal device cannot determine which cells corresponding to the specific measurement frequency to be measured, and report corresponding measurement results. If cells corresponding to all frequencies are measured and measurement results are reported, many of the measurement results are useless. This wastes air interface resources, and increases complexity of the terminal device.

Another network element may alternatively send the first indication information to the terminal device. For example, when the first network element is the MN, the SN may send the first indication information to the terminal device. Correspondingly, the terminal device may receive the first indication information from the SN. Alternatively, when the first network element is the SN, the MN may send the first indication information to the terminal device. Correspondingly, the terminal device may receive the first indication information from the MN. For example, the SN sends the first indication information to the terminal device, to indicate that the terminal device may carry a measurement result of the second frequency in a measurement report sent to the MN in response to the first measurement configuration from the MN.

The following describes the first frequency and the second frequency in detail.

In terms of a support capability of the terminal device, the terminal device supports the first frequency and the second frequency to form MR-DC or carrier aggregation (CA). In other words, the terminal device may report a measurement result of a cell corresponding to a non-serving frequency (the second frequency) that can form MR-DC or CA with the first frequency, so that the network side configures MR-DC or CA for the terminal device.

Optionally, the second frequency is already a measurement frequency corresponding to a measurement object in the measurement configuration configured by the network side for the terminal device, instead of a random frequency. Otherwise, the terminal device does not know which measurement results of cells corresponding to frequencies to be reported. Configuring a specific frequency help reduce a waste of radio resources.

Optionally, the first network element may not send the first indication information to the terminal device. The second frequency is a frequency, where the terminal device supports the frequency and the first frequency to form MR-DC or CA, and is a measurement frequency on which the network side (the MN or/and the SN) has configured a measurement configuration for the terminal device. Alternatively, the second frequency is a non-serving frequency on which the terminal device can currently obtain a measurement result, and the terminal device supports the frequency and the first frequency to form MR-DC or CA.

When the first network element is the MN, the first frequency is a frequency of a candidate MN, and the second frequency is a frequency of a candidate SN. Alternatively, when the first network element is the SN, the first frequency is a frequency of a candidate SN, and the second frequency is a frequency of a candidate MN.

In the foregoing scenario 1 to scenario 3, for scenario 1, the first frequency is a target PCell frequency in a target MN, and the second frequency is a target PSCell frequency in a target SN. For scenario 2, the first frequency is the target PSCell frequency in the target SN, and the second frequency is the target PCell frequency in the target MN. For scenario 3, the first frequency is the target PCell frequency in the target MN, and the second frequency is a target SCell frequency in the target MN.

In this embodiment of this application, the frequency of the candidate MN may also be referred to as a frequency of an MN to be handed over to, a frequency of the target MN, or the like. The frequency of the candidate SN may also be referred to as a frequency of the SN to be handed over to, a frequency of the target SN, or the like.

S602: The terminal device sends a measurement report to the first network element.

Correspondingly, the first network element receives the measurement report from the terminal device.

The first network element is the MN, and the terminal device may send an RRC message to the MN, where the RRC message includes the measurement report. Alternatively, when the first network element is the SN, and there is no SRB 3 between the SN and the terminal device, the terminal device sends an RRC message to the MN, where an RRC message that is sent by the terminal device to the SN and that includes the measurement report is encapsulated in the RRC message, and the MN sends, to the SN, the RRC message that is sent by the terminal device to the SN. Alternatively, when the first network element is the SN, and there is an SRB 3 between the SN and the terminal device, the terminal device may directly send an RRC message to the SN, where the RRC message includes the measurement report.

When the foregoing event is met (the report configuration of the first measurement configuration is an event report) or periodic (the report configuration of the first measurement configuration is a periodic report), the terminal device sends the measurement report to the first network element.

For example, the first measurement configuration delivered by the MN is an A3/A5 event for a neighboring frequency of a PSCell (that is, a measurement frequency of the A3/A5 event is different from a PSCell frequency). When the foregoing event is met, the terminal device may send the measurement report to the MN.

For example, the first measurement configuration delivered by the MN is an A3/A5 event for a neighboring frequency of a PCell (that is, a measurement frequency of the A3/A5 event is different from a PCell frequency). When the foregoing event is met, the terminal device may send the measurement report to the MN.

The following describes the measurement report in detail.

The measurement report includes a first measurement result of measuring the first cell and a second measurement result of measuring the second cell corresponding to the second frequency. Both the first measurement result and the second measurement result are available measurement results (the available results).

In the foregoing scenario 1 to scenario 3, for scenario 1, the first measurement result is a measurement result of a cell corresponding to the target PCell frequency in the target MN, and the second measurement result is a measurement result of a cell corresponding to the target PSCell frequency in the target SN. For scenario 2, the first measurement result is a measurement result of a cell corresponding to the target PSCell frequency in the target SN, and the second measurement result is a measurement result of a cell corresponding to the target PCell frequency in the target MN. For scenario 3, the first measurement result is the measurement result of the cell corresponding to the target PCell frequency in the target MN, and the second measurement result is a measurement result of a cell corresponding to the target SCell frequency in the target MN.

When a measurement result of the first cell is greater than a first threshold, and/or a measurement result of the second cell is greater than a second threshold, the terminal device may alternatively send the measurement report to the first network element.

In other words, the first measurement result includes identification information of the first cell and the measurement result of the first cell, and the measurement result of the first cell is greater than the first threshold. The second measurement result includes a cell identifier of the second cell and the measurement result of the second cell, and the measurement result of the second cell is greater than the second threshold.

The first threshold and/or the second threshold may be included in the first measurement configuration. In other words, the first measurement configuration includes the first threshold, and/or the first measurement configuration includes the second threshold.

Optionally, the first network element sends the second measurement result to a second network element. The first network element is the MN (that is, a source MN), and the second network element is the candidate MN (that is, the target MN); or the first network element is the SN, and the second network element is the MN. The network side needs to hand over the terminal device from the MN to the candidate MN, or if the network side needs to change a PSCell of the SN, a PCell of a corresponding MN needs to be changed. Therefore, the first network element sends the second measurement result to the second network element, and the second network element may configure a related resource for the terminal device based on the second measurement result, for example, configure MR-DC or CA for the terminal device. The second measurement result may be included in a handover request message sent by the first network element to the second network element, or included in an SN modification requirement message or an SN change requirement message.

According to the measurement method provided in this embodiment of this application, the first network element sends the first measurement configuration to the terminal device. Correspondingly, the terminal device receives the first measurement configuration, where the first measurement configuration indicates the terminal device to measure the first cell corresponding to the first frequency. The terminal device sends the measurement report to the first network element. Correspondingly, the first network element receives the measurement report from the terminal device. The measurement report includes the first measurement result of measuring the first cell and the second measurement result of measuring the second cell corresponding to the second frequency, where the second frequency is at least one non-serving frequency different from the first frequency. The terminal device reports the measurement result of the cell corresponding to the non-serving frequency, so that the network side can learn communication quality of the cell corresponding to the non-serving frequency. Therefore, a delay in handing over a serving frequency of the terminal device is reduced by determining whether to hand over a PCell frequency or a PSCell frequency to a corresponding non-serving frequency.

The following describes the measurement method in this application with reference to specific embodiments.

An embodiment of this application provides another measurement method, which may be applied to scenario 1, scenario 2, and scenario 3.

Figure 7:
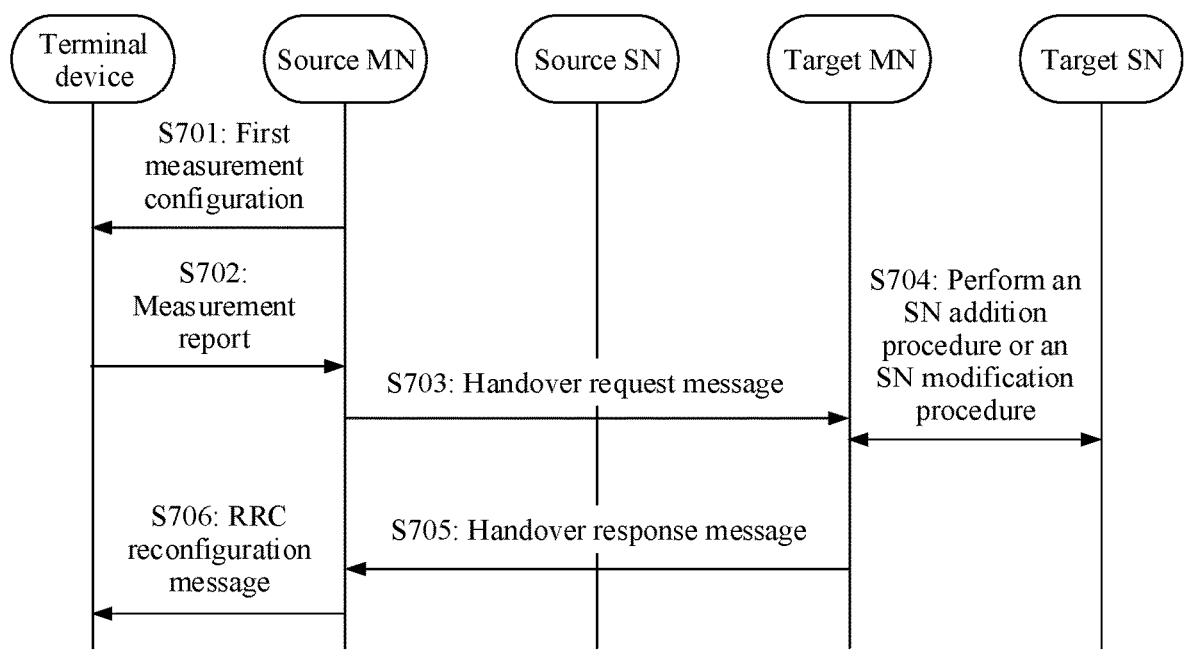
FIG. 7 is a schematic flowchart of a measurement method according to an embodiment of this application.

Specifically, as shown in FIG. 7, the measurement method includes the following steps.

S701: A source MN sends a first measurement configuration to a terminal device.

Corresponding to step S601, in this case, a first network element is the source MN. For other content of this step, refer to the descriptions in step S601. Details are not described herein again.

S702: The terminal device sends a measurement report to the source MN.

Corresponding to step S602, in this case, the first network element is the source MN. For other content of this step, refer to the descriptions in step S602. Details are not described herein again.

S703: The source MN sends a handover request message to a target MN.

For scenario 1, the source MN may change a PCell frequency, and change of the PCell frequency causes change of a PSCell frequency. In this case, a first frequency is a target PCell frequency in a target MN, and the second frequency is a target PSCell frequency in a target SN. Correspondingly, a first measurement result is a measurement result of a cell corresponding to the target PCell frequency in the target MN, and a second measurement result is a measurement result of a cell corresponding to the target PSCell frequency in the target SN. The source MN determines, based on the first measurement result, that handover of the PCell frequency meets a condition, determines, based on the second measurement result, that handover of the PSCell frequency meets a condition, and the target MN and the source MN are not a same MN. The source MN sends the handover request message to the target MN, where the handover request message includes the second measurement result, and the target MN determines whether to configure the target SN for the terminal device (for example, based on the second measurement result). The target MN sends an SN addition message to the target SN, where the SN addition message includes the second measurement result, and the target SN configures the target PSCell for the terminal device.

If the target MN and the source MN are the same MN, this step is not performed. The target MN or the source MN may reconfigure the PCell frequency and perform an SN change or modification procedure. If the target MN and the source MN share one SN, an SN modification procedure is performed. If the target SN is different from the source SN, an SN replacement procedure is performed.

For scenario 2, the source MN may change the PSCell frequency, so that change of the PSCell frequency causes change of the PCell frequency. In this case, the first frequency is the target PSCell frequency in the target SN, and the second frequency is the target PCell frequency in the target MN. Correspondingly, the first measurement result is the measurement result of the cell corresponding to the target PCell frequency in the target SN, and the second measurement result is the measurement result of the cell corresponding to the target PSCell frequency in the target MN. The source MN determines, based on the first measurement result, that handover of the PSCell frequency meets a condition, determines, based on the second measurement result, that handover of the PCell frequency meets a condition, and the target MN and the source MN are not a same MN. The source MN sends the handover request message to the target MN. The handover request message carries the first measurement result. The target MN determines whether to configure the target SN for the terminal device (for example, based on the first measurement result). The target MN sends an SN addition message to the target SN, where the SN addition message includes the first measurement result, and the target SN configures the target PSCell for the terminal device.

If the target MN and the source MN are the same MN, this step is not performed. The target MN or the source MN may reconfigure the PCell frequency and perform an SN change or modification procedure. If the target MN and the source MN share one SN, an SN modification procedure is performed. If the target SN is different from the source SN, an SN replacement procedure is performed.

For scenario 3, the source MN may change the PCell frequency, so that change of the PCell frequency causes change of an SCell frequency. In this case, the first frequency is the target PCell frequency in the target MN, and the second frequency is a target SCell frequency in the target MN. Correspondingly, the first measurement result is the measurement result of the cell corresponding to the target PCell frequency in the target MN, and the second measurement result is a measurement result of a cell corresponding to the target SCell frequency in the target MN. The source MN determines, based on the first measurement result, that handover of the PCell frequency meets a condition, determines, based on the second measurement result, that handover of the SCell frequency meets a condition, and the target MN and the source MN are not a same MN. The source MN sends the handover request message to the target MN, where the handover request message includes the second measurement result. The target MN determines whether to configure the target SCell frequency for the terminal device (for example, based on the second measurement result). If the target MN and the source MN are the same MN, this step is not performed, and only the SCell frequency and the PCell frequency are reconfigured.

S704: The target MN and the target SN perform an SN addition procedure or an SN modification procedure.

For scenarios 1 and 2, the PSCell frequency needs to be changed. If the source SN and target SN are not the same SN, the SN needs to be changed or modified. Therefore, the target MN and the target SN perform the SN addition procedure or the SN modification procedure.

Optionally, the target MN may send the second measurement result to the target SN. The target SN may configure a related resource for the terminal device based on the second measurement result, for example, select a PSCell for the terminal device.

It should be noted that when the target MN and the source MN are a same MN, a function of step S704 is to change the SN. When the target SN and the source SN are a same SN, a function of step S704 is to modify a configuration of the SN, for example, change a source PSCell to a target PSCell of the same SN.

S705: The target MN sends a handover response message to the source MN.

The handover response message includes an RRC reconfiguration message sent by the target MN to the terminal device.

S706: The source MN sends the RRC reconfiguration message to the terminal device.

If the MN changes, that is, the MN is handed over from the source MN to the target MN, the source MN sends, to the terminal device, the RRC reconfiguration message sent by the target MN.

According to the measurement method provided in this embodiment of this application, the terminal device reports a measurement result of a cell corresponding to a frequency with a combination restriction, to avoid increasing in a delay caused by that a network side cannot perform frequency handover because there is no measurement result of one of the cells, and this also avoids a case in which processing needs to be performed with reference to a measurement result that is of the cell and that is reported by the terminal device before or after. Therefore, increasing processing complexity of a base station is avoided.

An embodiment of this application provides another measurement method, which may be applied to scenario 2.

Figure 8:
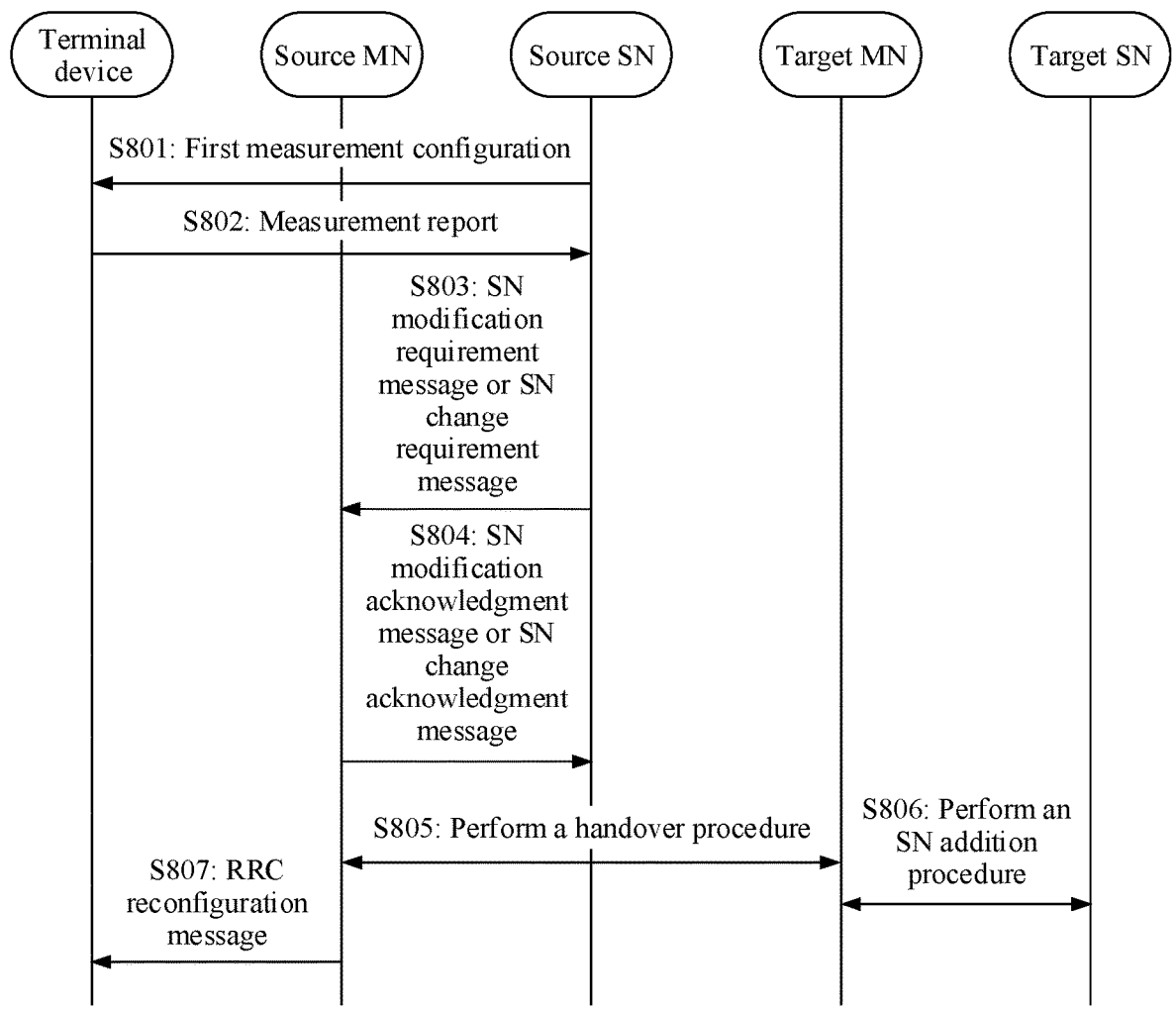
FIG. 8 is a schematic flowchart of a measurement method according to an embodiment of this application.

Specifically, as shown in FIG. 8, the measurement method includes the following steps.

S801: A source SN sends a first measurement configuration to a terminal device.

Corresponding to step S601, in this case, a first network element is the source SN. For other content of this step, refer to the descriptions in step S601. Details are not described herein again.

S802: The terminal device sends a measurement report to the source SN.

Corresponding to step S602, in this case, a first network element is the source SN. For other content of this step, refer to the descriptions in step S602. Details are not described herein again.

S803: The source SN sends an SN modification requirement message or an SN change requirement message to a source MN.

For scenario 2, the source SN may change a PSCell frequency, so that change of the PSCell frequency causes change of a PCell frequency. In this case, a first frequency is a target PSCell frequency in a target SN, and a second frequency is a target PCell frequency in a target MN. Correspondingly, a first measurement result is a measurement result of a cell corresponding to the target PCell frequency in the target SN, and a second measurement result is a measurement result of the cell corresponding to the target PSCell frequency in the target MN. The source SN determines, based on the first measurement result, that handover of the PSCell frequency meets a condition, and therefore sends the SN modification requirement message or the SN change requirement message to the source MN.

The SN modification request message or the SN change request message includes: information about a target PSCell requested for handover (for example, frequency information or cell information of the target PSCell), or an MR-DC frequency band combination corresponding to a frequency band of the target PSCell.

Optionally, the SN modification request message or the SN change request message includes the second measurement result.

S804: The source MN sends an SN modification acknowledgment message or an SN change acknowledgment message to the source SN.

The MN may determine, based on the second measurement result, that handover of the PCell frequency meets a condition (for example, signal quality of the target PCell frequency is good), and therefore respond to the source SN.

Optionally, when the target PCell frequency and the source PCell frequency do not belong to a same MN (that is, the source MN and the target MN are not a same MN), before or after S804, the method may further include steps S805 and S806.

S805: The source MN and the target MN perform a handover procedure.

In other words, the source MN sends the handover request message to the target MN, and the target MN sends the handover response message to the source MN. For details, reference may be made to steps S703 and S705, and details are not repeated herein.

S806: The target MN and the target SN perform an SN addition procedure.

It should be noted that when the target MN and the source MN are a same MN, a function of step S806 is to change the SN. Alternatively, the target SN and the source SN may be a same SN, because for the target MN, the target SN is a new SN.

S807: The source MN sends the RRC reconfiguration message to the terminal device.

Optionally, if the MN changes (that is, the MN is handed over from the source MN to the target MN), the source MN sends, to the UE, an RRC reconfiguration message sent by the target MN to the source MN.

According to the measurement method provided in this embodiment of this application, the terminal device reports a measurement result of a cell corresponding to a PSCell frequency and a measurement result of the cell corresponding to the PCell frequency that have a combination restriction, to avoid increasing in a delay caused by that a network side cannot perform frequency handover because there is no measurement result of the cell corresponding to the PCell frequency, and this also avoids a case in which processing needs to be performed with reference to a measurement result that is of the cell and that is reported by the terminal device before or after. Therefore, increasing processing complexity of a base station is avoided.

An embodiment of this application provides another measurement method. Based on scenario 1, scenario 2, or scenario 3, a condition for reporting a measurement result by the terminal device is strictly restricted, that is, reporting is performed only when the first measurement result and/or the second measurement result are/is good. For example, the first measurement result is greater than a threshold, and the second measurement result is greater than another threshold; or the first measurement result is greater than a measurement result of the PCell by a threshold, and the second measurement result is greater than a measurement result of the PSCell by another threshold.

Figure 9:
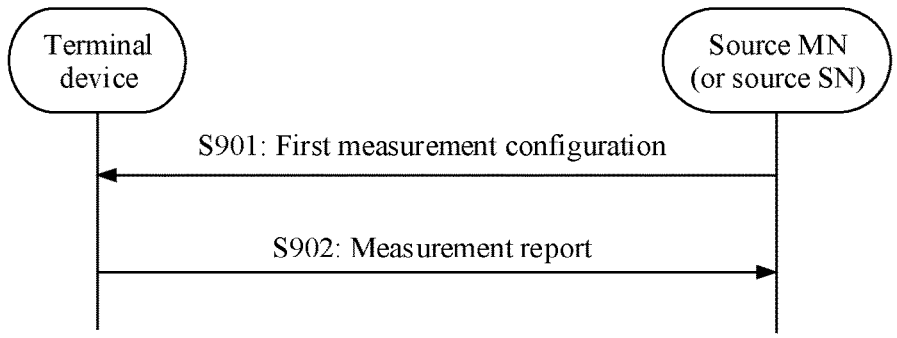
FIG. 9 is a schematic flowchart of a measurement method according to an embodiment of this application.

Specifically, as shown in FIG. 9, the measurement method includes the following steps.

S901: A source MN (or a source SN) sends a first measurement configuration to a terminal device.

A new event (for example, A7) may be defined in a report configuration of the first measurement configuration: a measurement result of a first cell corresponding to a first frequency is greater than a first threshold, and/or a measurement result of a second cell corresponding to a second frequency is greater than a second threshold. Optionally, the event further requires that a measurement result of a cell corresponding to a serving frequency deteriorates. For example, a measurement result of a PCell is less than a threshold, and a measurement result of a PSCell is less than another threshold.

A new event (for example, A8) may be defined in the report configuration of the first measurement configuration: The measurement result of the second cell corresponding to the second frequency and the measurement result of the first cell corresponding to the first frequency are better than the measurement result of the cell (for example, the PCell or the PSCell) corresponding to the serving frequency. For example, the measurement result of the first cell corresponding to the first frequency is greater than the measurement result of the PCell by a threshold, and the measurement result of the second cell corresponding to the second frequency is greater than the measurement result of the PSCell by another threshold.

Corresponding to step S601, in this case, the first network element is the source MN (or the source SN). For other content of this step, refer to the descriptions in step S601. Details are not described herein again.

S902: The terminal device sends a measurement report to the source MN (or the source SN).

In other words, when the foregoing event is met, the terminal device sends the measurement report to the source MN (or the source SN).

Corresponding to step S602, in this case, the first network element is the source MN (or the source SN). For other content of this step, refer to the descriptions in step S602. Details are not described herein again.

Subsequent steps S703 to S706 may be performed for the source MN, and subsequent steps S803 to S807 may be performed for the source SN.

According to the measurement method provided in this embodiment of this application, a condition for reporting the measurement result by the terminal device is strictly restricted, and the measurement result is reported only when the first measurement result and/or the second measurement result are/is good. This saves radio resources. In addition, a network side can learn communication quality of a cell corresponding to a non-serving frequency. Therefore, a delay in handing over a serving frequency of the terminal device is reduced by determining whether to hand over a PCell frequency or a PSCell frequency to a corresponding non-serving frequency.

In addition, currently, there is a power control sharing solution for NR-DC, including semi-static power sharing and dynamic power sharing, and the solution may be applied to a scenario in which the terminal device uses a spectrum in a frequency range 1 (frequency range 1, FR1) (a frequency range is 450 MHz to 6000 MHz) or a spectrum in a frequency range 2 (frequency range 2, FR2) (a frequency range is 24250 MHz to 52600 MHz) in both an MCG and an SCG. Specifically, the MN notifies the SN of a power sharing solution used by the terminal device.

The semi-persistent power sharing includes the following modes:

Mode 1 (mode 1): Transmission power of the terminal device in each cell group (cell group, CG) (that is, the MCG or the SCG) does not exceed maximum transmission (transmission) power of the CG configured by a network side, where the maximum transmission power is configured by the network side for the terminal device using an RRC message. For ease of description, maximum transmission power that is configured by the network side for the terminal device using the RRC message and that corresponds to the MCG is referred to as PMCG for short, and the maximum transmission power that is configured by the network side for the terminal device using the RRC message and that corresponds to the SCG is referred to as PSCG for short. The terminal device does not need to determine whether uplink transmission of the MCG overlaps with uplink transmission of the SCG in terms of time, and may directly determine maximum transmission power in the MCG based on the PMCG, and determine maximum transmission power in the SCG based on the PSCG.

Mode 2 (mode 2): When the terminal device performs uplink transmission in a first slot in one CG (for example, a CG1), the terminal device checks a semi-persistent transmission direction configuration of each symbol in another CG (for example, a CG2). The network side (the MN or the SN) notifies, in advance using the semi-persistent transmission direction configuration, the terminal device that a semi-persistent transmission direction corresponding to each symbol in each slot in each CG is uplink transmission, downlink transmission, or a flexible configuration (that is, may be uplink transmission or downlink transmission). The semi-persistent transmission direction configuration may be carried in a time division duplex (time division duplex, TDD) uplink-downlink common configuration (TDD-UL-DL-ConfigurationCommon) or a time division duplex uplink-downlink dedicated configuration (TDD-UL-DL-ConfigurationDedicated). For a CG, after receiving the TDD-UL-DL-ConfigurationCommon and the TDD-UL-DL-ConfigurationDedicated from the network side, the terminal device obtains a semi-persistent transmission direction of the CG by combining the two configurations. For example, the TDD-UL-DL-ConfigurationDedicated may cover a semi-persistent transmission direction that is set to "a semi-persistent transmission direction is a flexible configuration" in the TDD-UL-DL-ConfigurationCommon.

If uplink transmission in a first slot of the CG 1 may overlap uplink transmission in a second slot of the CG 2 (that is, at least one symbol in the first slot overlaps at least one symbol in the second slot that is configured as uplink transmission or flexibly configured), in this case, the terminal device restricts transmission power of the uplink transmission in the first slot not to exceed maximum transmission power of the CG 1 configured by the network side for the terminal device (the maximum transmission power PMCG or PSCG configured by the network side using the RRC message). Otherwise, when determining the transmission power of the uplink transmission in the first slot, the terminal device does not need to consider the maximum transmission power (the PMCG or the PSCG) that is configured by the network side for the terminal device in the CG using the RRC message.

Dynamic Power Sharing:

If the uplink transmission of the terminal device in the first slot of the MCG and the uplink transmission of the terminal device in the second slot of the SCG overlap in terms of time, and a sum of the transmission power of the terminal device in the first slot of the MCG and the transmission power of the terminal device in the second slot of the SCG is greater than maximum transmission power of available to the terminal device, in this case, the terminal device decreases the transmission power of the SCG in the second slot, so that a sum of the transmission power of the terminal device in the first slot of the MCG and the transmission power of the terminal device in the second slot of the SCG is less than or equal to the maximum transmission power available to the terminal device.

For ease of description, the transmission power of the terminal device in the first slot of the MCG is referred to as PMCG_actual for short, the transmission power of the terminal device in the second slot of the SCG is referred to as PSCG_actual for short, and the maximum transmission power available to the terminal device is referred to as Ptotal for short. The PMCG_actual is transmission power that is of the terminal device in the first slot and that is calculated by the terminal device based on the PMCG as the maximum transmission power, the PSCG_actual is transmission power that is of the terminal device in the second slot and that is calculated by the terminal device based on the PSCG as the maximum transmission power, and the Ptotal is maximum transmission power configured for the terminal device in NR-DC. If the uplink transmission of the terminal device in the first slot of the MCG and the uplink transmission of the terminal device in the second slot of the SCG do not overlap in terms of time, the terminal device does not need to consider the PMCG when determining the transmission power in the first slot of the MCG, and does not need to consider the PSCG when determining the transmission power in the second slot of the SCG.

For details about the foregoing power sharing modes, refer to descriptions in the 3GPP protocol 38.213.

It can be learned from the foregoing power sharing modes that, for the semi-static sharing mode 2, after the MN and the SN know the semi-static transmission direction configuration of each other, the MN and the SN may perform scheduling based on the maximum transmission power currently available to the terminal device (for example, if uplink transmission overlaps, the MN or the SN schedules the terminal device based on the maximum transmission power PMCG or PSCG available to the terminal device. If uplink transmission does not overlap, the MN or the SN does not need to consider impact of the PMCG or the PSCG to schedule the terminal device). For example, Ptotal is used as the maximum transmission power available to the terminal device to schedule the terminal device, so that resource utilization is improved. Therefore, the MN and the SN need to exchange semi-persistent transmission directions corresponding to serving cells configured for the MN and the SN.

In addition, in an asynchronous CA scenario, timings of two carriers may be different. For example, frame boundaries are not aligned but slot boundaries are aligned. The base station notifies the terminal device of a timing offset between carriers of the base station, where the timing offset is a slot offset. For example, for the MN, the terminal device is notified of a timing offset of each secondary component carrier of the MN relative to the PCell; and for the SN, the terminal device is notified of a timing offset of each secondary component carrier of the SN relative to the PSCell.

In the asynchronous CA scenario, the MN and the SN know only a semi-persistent transmission direction configuration of each serving cell of each other, but do not know a timing offset between the serving cells of each other, and still cannot estimate whether the uplink transmission overlaps. Therefore, different maximum transmission power currently available to the terminal device cannot be estimated, so that resource utilization is affected.

An embodiment of this application provides a timing offset sending method. An MN and an SN notify each other of a timing offset between serving cells configured by the MN and the SN for a terminal device, so that the MN and the SN can estimate, after further knowing a semi-persistent transmission direction configuration of each serving cell of each other, whether uplink transmission overlaps, and further schedule an uplink transmission resource based on maximum transmission power of the terminal device in a corresponding CG. This improves resource utilization.

Figure 10:
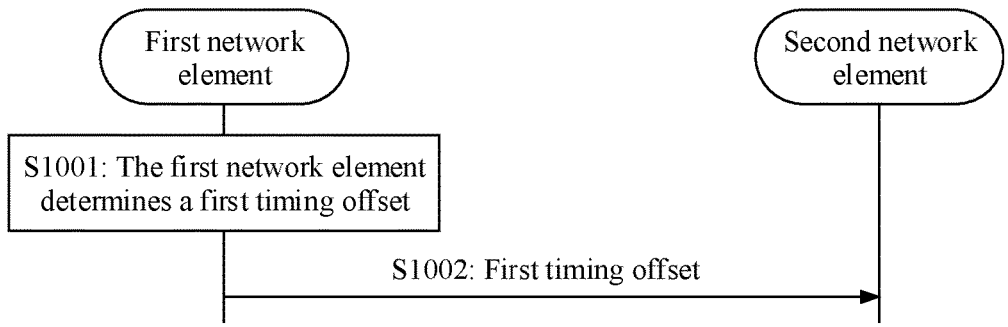
FIG. 10 is a schematic flowchart of a timing offset sending method according to an embodiment of this application.

Specifically, as shown in FIG. 10, the timing offset sending method includes the following steps.

S1001: A first network element determines a first timing offset.

The first timing offset refers to a slot offset of a first cell managed by the first network element relative to a second cell managed by the first network element.

The second cell may be a serving cell managed by the first network element, the first cell may be a serving cell managed by the first network element other than the second cell, or the first cell may be a non-serving cell managed by the first network element other than the second cell. In other words, the first cell may be any cell managed by the first network element other than the second cell. Because the terminal device does not send an uplink signal in a deactivated cell, the serving cell may not include a deactivated serving cell. For example, when the first network element is an MN, the second cell is a PCell, and the first cell is another serving cell configured by the MN for the terminal device. When the first network element is an SN, the second cell is a PSCell, and the first cell is another serving cell configured by the SN for the terminal device.

Optionally, the second cell may be a cell managed by the first network element, and may be a non-serving cell of the terminal device. The first cell may be a cell managed by the first network element other than the second cell, and may be a cell that is of the first network element and that does not belong to a serving cell of the terminal device. The first network element may determine slot offsets of all first cells of the network element relative to the second cell.

The first timing offset may correspond to a specific reference subcarrier spacing. For example, when the reference subcarrier spacing is 15 kHz, a value range of the first timing offset is (−2 to 2). When the reference subcarrier spacing is 30 KHz, the value range of the first timing offset is (−5 to 5). When the reference subcarrier spacing is 60 KHz, the value range of the first timing offset is (−10 to 10). When the reference subcarrier spacing is 120 KHz, the value range of the first timing offset is (−20 to 20).

Optionally, the reference subcarrier spacing is a reference subcarrier spacing that is corresponding to the first cell and that is specified by the first network element.

Optionally, the reference subcarrier spacing is a larger value of a first subcarrier spacing and a second subcarrier spacing. The first subcarrier spacing is a lowest subcarrier spacing in an uplink-downlink subcarrier spacing list in a serving cell configuration of a special serving cell (lowest SCS among all the configured SCSs in DL/UL SCS-SpecificCarrierList in ServingCellConfig) in the first network element of the terminal. The second subcarrier spacing is a lowest subcarrier spacing in an uplink-downlink subcarrier spacing list in a serving cell configuration of the first cell (lowest SCS among all the configured SCSs in DL/UL SCS-SpecificCarrierList in ServingCellConfig) of the terminal device.

S1002: The first network element sends the first timing offset to a second network element.

Correspondingly, the second network element receives the first timing offset from the first network element.

The first network element is the MN, and the second network element is the SN; or the first network element is the SN, and the second network element is the MN. When a CU and a DU of the MN are separated, the first network element may be the DU of the MN, and the second network element may be the CU of the MN. When a CU and a DU of the SN are separated, the first network element may be the DU of the SN, and the second network element may be the CU of the SN.

The first timing offset may be included in a message between the MN and the SN, or may be included in a container carried in the message (for example, CG-Config-Info or CG-Config).

For example, when the first network element is the MN, the second network element is the SN, the second cell is the PCell, and the first cell is a serving cell managed by the MN other than the second cell, the first timing offset may be included in a message (for example, a secondary node addition request (S-NODE addition request) message in Xn) for requesting to prepare an MR-DC resource for the terminal device, or is included in a message (for example, a secondary node modification request (S-NODE modification request) message in Xn) for requesting to modify an MR-DC resource configured for the terminal device.

Alternatively, when the first network element is the SN, the second network element is the MN, the second cell is a PSCell, and the first cell is a serving cell managed by the SN other than the second cell, the first timing offset may be included in a response message (for example, a secondary node addition request acknowledge (S-NODE addition request acknowledge) message in Xn) for requesting to prepare an MR-DC resource for the terminal device; or is included in an acknowledge message (for example, a secondary node modification request acknowledge (S-NODE modification request acknowledge) message in Xn) for requesting to modify the MR-DC resource configured for the terminal device.

For example, when the first network element is the MN (or the SN), the second network element is the SN (or the MN), and the first cell is a cell (including a non-serving cell of the terminal device served by the first network element) managed by the MN (or the SN) other than the second cell, the first timing offset may be included in a message (for example, an Xn setup request (Xn setup request) message or an Xn setup response (Xn setup response) message) for requesting to establish an interface instance of a control plane between two nodes with the SN. Optionally, the first timing offset may be sent in a same message together with semi-persistent transmission direction configurations (that is, TDD downlink-uplink configurations (TDD DL-UL Configurations)) of the first cell and the second cell.

For example, when the first network element is the DU of the MN (or the SN), the second network element is the CU of the MN (or the SN), and the first cell is the serving cell managed by the MN (or the SN) other than the second cell, the first timing offset may be included in the following messages, for example, a UE context setup response (UE context setup response) message, a UE context modification response (UE context modification response) message, or a UE context modification required (UE context modification required) message.

For example, when the first network element is the DU of the MN (or the SN), the second network element is the CU of the MN (or an SN), and the first cell is the cell managed by the MN (or the SN) other than the second cell (including cells that are of the first network element and that are not serving cells of the terminal device), the first timing offset may be included in the following messages, for example, an F1 setup request (F1 setup request) message or a DU configuration update (DU configuration update) message.

Optionally, when the first network element sends the timing offset of the first cell to the second network element, identification information of the first cell is further carried, to indicate a timing offset of which cell relative to the second cell is the timing offset. The identification information may be a physical cell identifier (PCI) or a cell global identifier (CGI).

Optionally, the first network element may further send information about the second cell to the second network element. In an example embodiment, a specific cell in the cell list may be indicated as the second cell. For example, in a cell list managed by the first network element and carried in an Xn setup request (Xn setup request) message or an Xn setup response (Xn setup response) message, a cell is specified as the second cell; or a first cell in the cell list is fixedly used as the second cell. In another example embodiment, identification information of the second cell may be indicated.

Optionally, the first network element may further send a semi-persistent transmission direction configuration of the first cell and/or a semi-persistent transmission direction configuration of the second cell to the second network element, that is, a TDD downlink-uplink configuration (TDD DL-UL Configuration). For example, the configuration may be included in the following messages: an Xn setup request (Xn setup request) message or an Xn setup response (Xn setup response) message, a secondary node addition request (S-NODE addition request) message, or an MR-DC resource modification request (S-NODE modification request) message configured for the terminal device.

Optionally, the first network element may further send a power sharing mode of the terminal device to the second network element. Optionally, the power sharing mode is a mode 2 in semi-persistent power sharing. Alternatively, only when a power sharing scheme configured by the MN (which may be the first network element or the second network element) for the terminal device is the mode 2 in semi-persistent power sharing, the first network element sends the first timing offset to the second network element.

After obtaining the semi-persistent power sharing scheme and the semi-persistent transmission direction configuration of the first network element, the second network element can estimate whether uplink transmission of the terminal device overlaps, and schedule the terminal device based on a currently available maximum transmission power uplink scheduling. This improves resource utilization. For example, if uplink transmission overlaps, the second network element schedules the terminal device based on that the maximum transmission power of the terminal device is a PMCG or a PSCG; or if uplink transmission does not overlap, the second network element schedules the terminal device based on that the maximum transmission power of the terminal device is a predefined value According to the timing offset sending method provided in this embodiment of this application, the first network element sends the first timing offset to the second network element, where the first timing offset is the slot offset of the first cell managed by the first network element relative to the second cell managed by the first network element. The first network element may be an MN, and the second network element may be an SN, or the first network element may be an SN, and the second network element may be an MN, so that the MN and the SN notify each other of a timing offset of the MN and a timing offset of the SN, and the MN and the SN further know a semi-persistent transmission direction configuration of each other. In this way, whether uplink transmission overlaps can be estimated, and then an uplink transmission resource can be scheduled based on maximum transmission power of the terminal device in a corresponding CG. This improves resource utilization.

Figure 11:
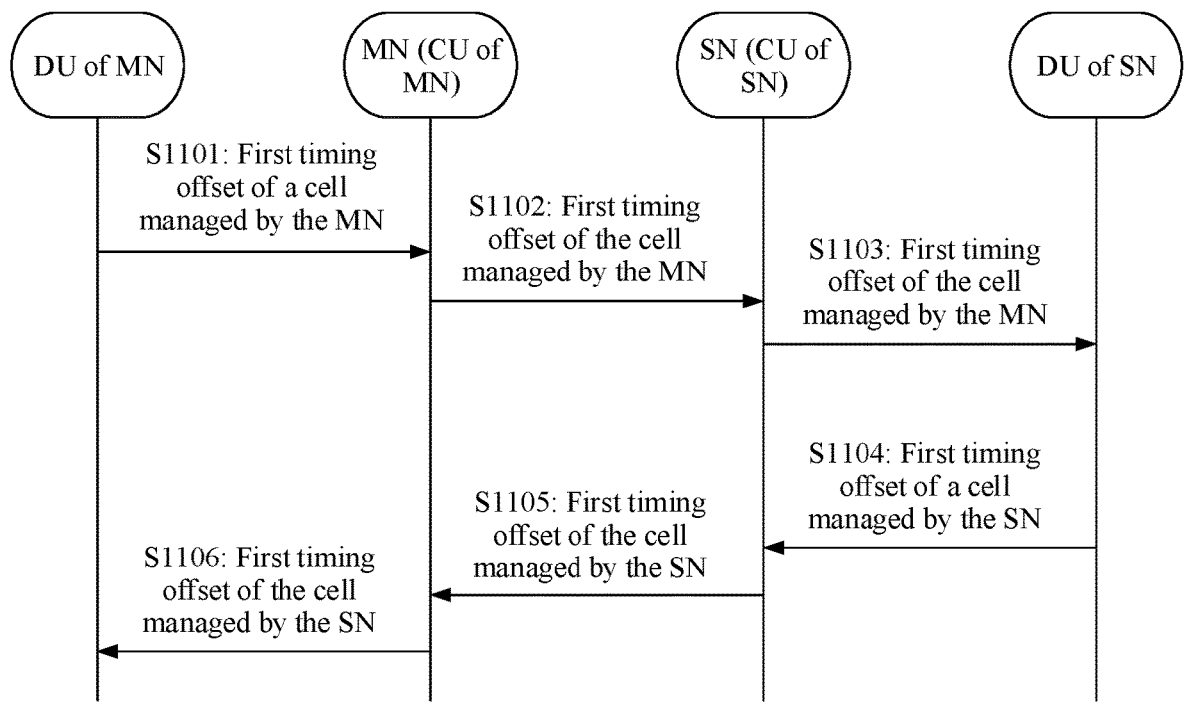
FIG. 11 is a schematic flowchart of another timing offset sending method according to an embodiment of this application.

The following describes the timing offset method with reference to an MN or an SN in which a DU and a CU are separated. As shown in FIG. 11, an embodiment of this application provides another timing offset sending method, including the following steps.

S1101: A DU of an MN sends, to a CU of the MN, a first timing offset of a cell managed by the MN.

Correspondingly, the CU of the MN receives, from the DU of the MN, the first timing offset of the cell managed by the MN.

In this case, the DU of the MN serves as a first network element, and the CU of the MN serves as a second network element. For the first timing offset, refer to the foregoing descriptions, and details are not described herein again.

Step S1101 is optional. When the CU and the DU of the MN are separated, step S1101 may be performed.

S1102: The MN (the CU of the MN) sends, to the SN (the CU of the SN), a first timing offset of the cell managed by the MN.

Correspondingly, the SN (the CU of the SN) receives, from the MN (the CU of the MN), the first timing offset of the cell managed by the MN.

In this case, the MN (the CU of the MN) serves as the first network element, and the SN (the CU of the SN) serves as the second network element. For the first timing offset, refer to the foregoing descriptions, and details are not described herein again. Optionally, when the first network element sends the timing offset of the first cell to the second network element, identification information of the first cell is further carried, to indicate a timing offset of which cell relative to the second cell is the timing offset. The identification information may be a physical cell identifier or a cell global identifier.

Step S1102 is optional. To be specific, interaction between the CU and the DU in a base station and interaction between base stations (between the MN and the SN) are independent of each other. For example, performing step S1101 does not necessarily perform step S1102, and performing step S1102 does not necessarily perform step S1101.

S1103: The CU of the SN sends, to the DU of the SN, the first timing offset of the cell managed by the MN.

Correspondingly, the SN (the DU of the SN) receives, from the SN (the CU of the SN), the first timing offset of the cell managed by the MN.

For example, when the first cell is a serving cell managed by the MN other than the second cell, the first timing offset may be included in the following messages, for example, a UE context setup request (UE context setup request) message, a UE context modification request message, or a UE context modification confirm message.

For example, when the first cell is a cell managed by the MN other than the second cell, the first timing offset may be included in the following message, for example, an F1 setup response message or a DU configuration update acknowledge message.

Step S1103 is optional. When the CU and the DU of the SN are separated, step S1103 may be performed.

S1104: The DU of the SN sends, to the CU of the SN, the first timing offset of the cell managed by the SN.

Correspondingly, the CU of the SN receives, from the DU of the SN, the first timing offset of the cell managed by the SN.

In this case, the DU of the SN serves as a first network element, and the CU of the SN serves as a second network element. For the first timing offset, refer to the foregoing descriptions, and details are not described herein again. Optionally, when the first network element sends the timing offset of the first cell to the second network element, identification information of the first cell is further carried, to indicate a timing offset of which cell relative to the second cell is the timing offset. The identification information may be a physical cell identifier or a cell global identifier.

Step S1104 is optional. When the CU and the DU of the SN are separated, step S1104 may be performed.

S1105: The SN (the CU of the SN) sends, to the MN (the CU of the MN), a first timing offset of the cell managed by the SN.

Correspondingly, the MN (the CU of the MN) receives, from the SN (the CU of the SN), the first timing offset of the cell managed by the SN.

In this case, the SN (the CU of the SN) serves as the first network element, and the MN (the CU of the MN) serves as the second network element. For the first timing offset, refer to the foregoing descriptions, and details are not described herein again.

Step S1105 is optional. To be specific, interaction between the CU and the DU in a base station and interaction between base stations (between the MN and the SN) are independent of each other. For example, performing step S1104 does not necessarily perform step S1105, and performing step S1105 does not necessarily perform step S1104.

S1106: The CU of the MN sends, to the DU of the MN, the first timing offset of the cell managed by the SN.

For example, when the first cell is a serving cell managed by the SN other than the second cell, the first timing offset may be included in the following messages, for example, a UE context setup request message, a UE context modification request message, or a UE context modification confirm message.

For example, when the first cell is a cell managed by the SN other than the second cell, the first timing offset may be included in the following message, for example, an F1 setup response message or a DU configuration update acknowledge message.

Step S1106 is optional. When the CU and the DU of the MN are separated, step S1106 may be performed.

According to the timing offset sending method provided in this embodiment of this application, in addition to the foregoing descriptions that resource utilization can be improved, exchange of the timing offset between the CU and the DU in the base station (the MN or the SN) is independent of exchange of the timing offset between the MN and the SN.

In addition, for a current NR-DC, in a process of establishing an Xn interface between the MN and the SN, semi-persistent transmission direction configurations corresponding to cells managed by the MN and the SN are exchanged. The configurations are not specific to a specific terminal device. In addition, currently, the MN and the SN do not know serving cells configured by each other for the terminal device. However, in the mode 2 (mode 2) of the semi-persistent sharing solution, a semi-persistent transmission direction configuration of a serving cell corresponding to the terminal device needs to be considered. If the MN and the SN additionally exchange the semi-persistent transmission direction configuration of the serving cell corresponding to the terminal device, signaling overheads between the MN and the SN increase. An embodiment of this application provides a configuration information sending method, to reduce signaling overheads of interaction between an MN and an SN.

Figure 12:
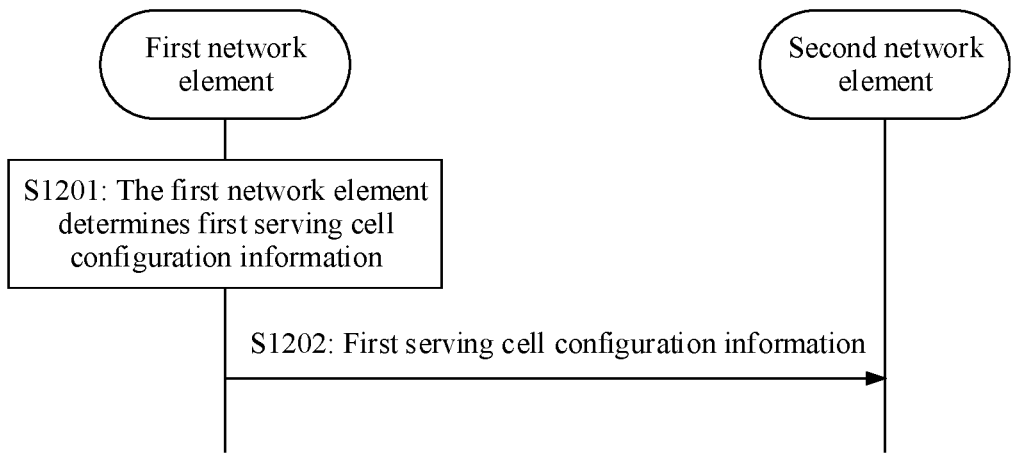
FIG. 12 is a schematic flowchart of a configuration information sending method according to an embodiment of this application.

Specifically, as shown in FIG. 12, the configuration information sending method includes the following steps.

S1201: A first network element determines first serving cell configuration information.

The first serving cell configuration information is identity information of all serving cells configured by the first network element for a terminal device. The identification information may be a physical cell identifier PCI or a cell global identifier CGI.

S1202: The first network element sends the first serving cell configuration information to a second network element.

Correspondingly, the second network element receives the first serving cell configuration information from the first network element.

The first network element is the MN, and the second network element is the SN; or the first network element is the SN, and the second network element is the MN. When a CU and a DU of the MN are separated, the first network element may be the DU of the MN, and the second network element may be the CU of the MN. When a CU and a DU of the SN are separated, the first network element may be the DU of the SN, and the second network element may be the CU of the SN.

For example, when the first network element is the MN, the second network element is the SN, the first serving cell configuration information may be included in a message (for example, a secondary node addition request (S-NODE addition request) message in Xn) for requesting to prepare an MR-DC resource for the terminal device, or is included in a message (for example, a secondary node modification request (S-NODE modification request) message in Xn) for requesting to modify an MR-DC resource configured for the terminal device.

For example, when the first network element is the SN, the second network element is the MN, the second cell is a PSCell, and the first cell is a serving cell managed by the SN other than the second cell, the first serving configuration information may be included in a response message (for example, a secondary node addition request acknowledge (S-NODE addition request acknowledge) message in Xn) for requesting to prepare an MR-DC resource for the terminal device; or is included in an acknowledge message (for example, a secondary node modification request acknowledge (S-NODE modification request acknowledge) message in Xn) for requesting to modify the MR-DC resource configured for the terminal device.

For example, when the first network element is the DU of the MN (or the SN), the second network element is the CU of the MN (or the SN), the first serving configuration information may be included in the following messages: for example, a UE context setup response message, a UE context modification response message, or a UE context modification required message.

Optionally, the CU of the MN may send, to the DU of the MN, the first serving cell configuration information received from the SN, so that the DU can learn of the semi-persistent transmission direction of each serving cell configured by the SN for the terminal device. Similarly, the CU of the SN may send, to the DU of the SN, the first serving cell configuration information received from the MN.

Optionally, the first network element may send semi-persistent transmission direction configuration information of all cells (including a non-serving cell of the terminal device) managed by the first network element to the second network element. The semi-persistent transmission direction configuration information includes identification information of the cell and a semi-persistent transmission direction of the cell.

For example, the first network element is the MN, and the second network element is the SN; or the first network element is the SN, and the second network element is the MN. The semi-persistent transmission direction configuration information of all cells (including the non-serving cell of the terminal device) managed by the first network element may be included in a message (for example, an Xn setup request message or an Xn setup response message) for establishing an Xn interface between the first network element and the second network element.

For example, the first network element is the DU of the MN (or the SN), and the second network element is the CU of the MN (or the SN). The semi-persistent transmission direction configuration information of all cells (including the non-serving cell of the terminal device) managed by the first network element may be included in a message for establishing an F1 interface between the first network element and the second network element, for example, an F1 setup request message or a DU configuration update message.

The second network element may learn, based on the first serving cell configuration information and the semi-persistent transmission direction configuration information of all cells (including the non-serving cell of the terminal device) managed by the first network element, semi-persistent transmission direction configuration information of each serving cell configured by the first network element for the terminal device.

According to the configuration information sending method provided in this embodiment of this application, existing semi-persistent transmission directions of all cells exchanged between access network devices are used, and only identification information of serving cells configured by an MN and an SN for the terminal device needs to be exchanged, a semi-persistent transmission direction corresponding to the serving cell configured for the terminal device can be obtained. This reduces signaling exchange overhead.

It should be noted that the methods in FIG. 11 and FIG. 12 may be combined with each other, or may be implemented independently.

It may be understood that, in the foregoing embodiments, the methods and/or steps implemented by the terminal device may also be implemented by a component (for example, a chip or a circuit) that can be used in the terminal device, the methods and/or steps implemented by the first network element may also be implemented by a component that can be used in the first network element, and the methods and/or steps implemented by the second network element may also be implemented by a component that can be used in the second network element.

The foregoing mainly describes the solutions provided in embodiments of this application from a perspective of interaction between network elements. Correspondingly, an embodiment of this application further provides a communication apparatus, and the communication apparatus is configured to implement the foregoing method. The communication apparatus may be the terminal device in the foregoing method embodiments, or an apparatus including the foregoing terminal device, or a chip or a function module in the terminal device. Alternatively, the communication apparatus may be the first network element in the foregoing method embodiments, or an apparatus including the first network element, or a chip or a function module in the first network element. Alternatively, the communication apparatus may be the second network element in the foregoing method embodiments, or an apparatus including the second network element, or a chip or a function module in the second network element.

It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software function module. It should be noted that, in embodiments of this application, module division is an example, and is merely a logical function division. In actual implementation, another division manner may be used.

Figure 13:
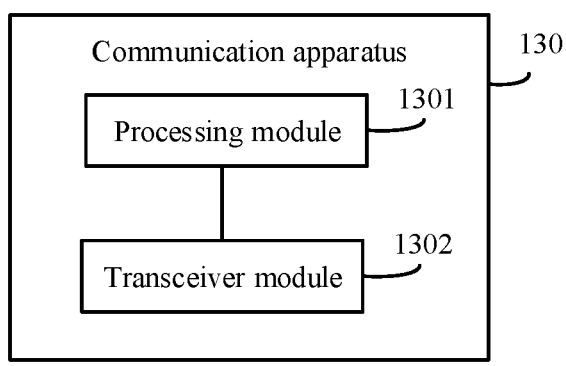
FIG. 13 is a schematic diagram of a structure of a communication apparatus according to an embodiment of this application.

For example, the communication apparatus is the terminal device in the foregoing method embodiments. FIG. 13 is a schematic diagram of a structure of a communication apparatus 130. The communication apparatus 130 includes a processing module 1301 and a transceiver module 1302. The communication apparatus 130 may be the terminal device in FIG. 1. The processing module 1301 may also be referred to as a processing unit, and is configured to implement a processing function of the terminal device in the foregoing method embodiments. For example, step S1001 in FIG. 10 and step S1201 in FIG. 12 are performed. The transceiver module 1302 may also be referred to as a transceiver unit, and is configured to implement a transceiver function of the terminal device in the foregoing method embodiments. For example, steps S601 and S602 in FIG. 6, steps S701, S702, and S706 in FIG. 7, steps S801, S802, and S807 in FIG. 8, and steps S901 and S902 in FIG. 9 are performed. The transceiver module 1302 may be referred to as a transceiver circuit, a transceiver machine, a transceiver, or a communication interface.

For example, the transceiver module 1302 is configured to receive a first measurement configuration from a first network element, where the first measurement configuration indicates the communication apparatus to measure a first cell corresponding to a first frequency. The transceiver module 1302 is further configured to send a measurement report to the first network element, where the measurement report includes a first measurement result of measuring the first cell and a second measurement result of measuring a second cell corresponding to a second frequency, and the second frequency refers to at least one non-serving frequency different from the first frequency.

In an example embodiment, the transceiver module 1302 is further configured to receive first indication information, where the first indication information indicates identification information of the second frequency, or the first indication information indicates information about a second measurement configuration that includes the second frequency.

In an example embodiment, the first indication information is included in the first measurement configuration.

In an example embodiment, the first measurement configuration further indicates to measure the second cell.

In an example embodiment, the first network element is a master node MN, and the second frequency is a frequency of a candidate secondary node SN; or the first network element is an SN, and the second frequency is a frequency of a candidate MN.

In an example embodiment, the communication apparatus supports the first frequency and the second frequency to form multi-radio dual connectivity MR-DC or carrier aggregation CA.

In an example embodiment, the first measurement result includes identification information of the first cell and a measurement result of the first cell, and the measurement result of the first cell is greater than a first threshold.

In an example embodiment, the second measurement result includes a cell identifier of the second cell and a measurement result of the second cell, and the measurement result of the second cell is greater than a second threshold.

In an example embodiment, the transceiver module 1302 is specifically configured to: when a measurement result of the first cell is greater than a first threshold, and a measurement result of the second cell is greater than a second threshold, send the measurement report to the first network element.

In an example embodiment, the first measurement configuration includes the first threshold.

In an example embodiment, the first measurement configuration includes the second threshold.

In this embodiment, the communication apparatus 130 is presented in a form of function modules obtained through division in an integrated manner. The module herein may be an ASIC, a circuit, a processor that executes one or more software or firmware programs, a memory, an integrated logic circuit, and/or another component capable of providing the foregoing functions.

Specifically, a function/implementation process of the processing module 1301 in FIG. 13 may be implemented by a processor in the terminal device by invoking computer-executable instructions stored in a memory. A function/implementation process of the transceiver module 1302 in FIG. 13 may be implemented via an RF circuit in the terminal device.

Because the communication apparatus 130 provided in this embodiment may perform the foregoing method, for a technical effect that can be achieved by the communication apparatus 130, refer to the foregoing method embodiment. Details are not described herein again.

Figure 14:
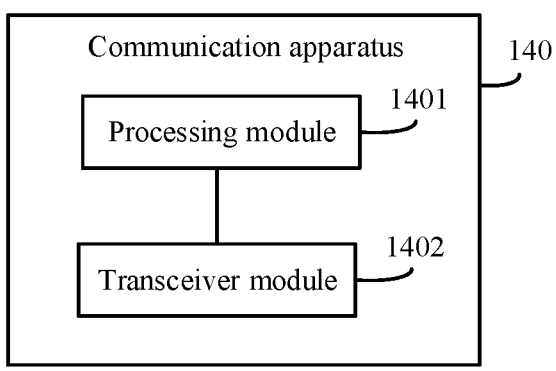
FIG. 14 is a schematic diagram of a structure of a communication apparatus according to an embodiment of this application.

For example, the communication apparatus is the first network element, the second network element, the MN, and the SN in the foregoing method embodiments. FIG. 14 is a schematic diagram of a structure of a communication apparatus 140. The communication apparatus 140 includes a processing module 1401 and a transceiver module 1402. The communication apparatus 140 may be the access network device in FIG. 1. The processing module 1401 may also be referred to as a processing unit, and is configured to implement a processing function of the access network device in the foregoing method embodiments. For example, step S1001 in FIG. 10 and step S1201 in FIG. 12 are performed. The transceiver module 1402 may also be referred to as a transceiver unit, and is configured to implement a transceiver function of the access network device in the foregoing method embodiments. For example, steps S601 and S602 in FIG. 6, steps S701 to S706 in FIG. 7, steps S801 to S807 in FIG. 8, steps S901 and S902 in FIG. 9, step S1002 in FIG. 10, steps S1101 to S1106 in FIG. 11, and step S1202 in FIG. 12 are performed. The transceiver module 1402 may be referred to as a transceiver circuit, a transceiver machine, a transceiver, or a communication interface.

For example, the transceiver module 1402 is configured to receive a first measurement configuration from a first network element, where the first measurement configuration indicates the communication apparatus to measure a first cell corresponding to a first frequency. The transceiver module 1402 is further configured to send a measurement report to the first network element, where the measurement report includes a first measurement result of measuring the first cell and a second measurement result of measuring a second cell corresponding to a second frequency, and the second frequency refers to at least one non-serving frequency different from the first frequency.

In an example embodiment, the transceiver module 1402 is further configured to receive first indication information, where the first indication information indicates identification information of the second frequency, or the first indication information indicates information about a second measurement configuration that includes the second frequency.

In an example embodiment, the first indication information is included in the first measurement configuration.

In an example embodiment, the first measurement configuration further indicates to measure the second cell.

In an example embodiment, the first network element is a master node MN, and the second frequency is a frequency of a candidate secondary node SN; or the first network element is an SN, and the second frequency is a frequency of a candidate MN.

In an example embodiment, the communication apparatus supports the first frequency and the second frequency to form multi-radio dual connectivity MR-DC or carrier aggregation CA.

In an example embodiment, the first measurement result includes identification information of the first cell and a measurement result of the first cell, and the measurement result of the first cell is greater than a first threshold.

In an example embodiment, the second measurement result includes a cell identifier of the second cell and a measurement result of the second cell, and the measurement result of the second cell is greater than a second threshold.

In an example embodiment, the transceiver module 1402 is specifically configured to: when a measurement result of the first cell is greater than a first threshold, and a measurement result of the second cell is greater than a second threshold, send the measurement report to the first network element.

In an example embodiment, the first measurement configuration includes the first threshold.

In an example embodiment, the first measurement configuration includes the second threshold.

For example, the transceiver module 1402 is configured to send a first measurement configuration to a terminal device, where the first measurement configuration indicates the terminal device to measure a first cell corresponding to a first frequency. The transceiver module 1402 is further configured to receive a measurement report from the terminal device, where the measurement report includes a first measurement result of measuring the first cell and a second measurement result of measuring a second cell corresponding to a second frequency, and the second frequency refers to at least one non-serving frequency different from the first frequency.

In an example embodiment, the transceiver module 1402 is further configured to send first indication information to the terminal device, where the first indication information indicates identification information of the second frequency, or the first indication information indicates information about a second measurement configuration that includes the second frequency.

In an example embodiment, the first indication information is included in the first measurement configuration.

In an example embodiment, the first measurement configuration further indicates to measure the second cell.

In an example embodiment, the communication apparatus is a master node MN, and the second frequency is a frequency of a candidate secondary node SN; or the communication apparatus is an SN, and the second frequency is a frequency of a candidate MN.

In an example embodiment, the transceiver module 1402 is further configured to send the second measurement result to a second network element, where the communication apparatus is the MN, and the second network element is the candidate MN, or the communication apparatus is the SN, and the second network element is the MN.

In an example embodiment, the terminal device supports the first frequency and the second frequency to form multi-radio dual connectivity MR-DC or carrier aggregation CA.

In an example embodiment, the first measurement result includes identification information of the first cell and a measurement result of the first cell, and the measurement result of the first cell is greater than a first threshold.

In an example embodiment, the second measurement result includes a cell identifier of the second cell and a measurement result of the second cell, and the measurement result of the second cell is greater than a second threshold.

In an example embodiment, the transceiver module 1402 is specifically configured to: when a measurement result of the first cell is greater than a first threshold, and a measurement result of the second cell is greater than a second threshold, receive the measurement report from the terminal device.

In an example embodiment, the first measurement configuration includes the first threshold.

In an example embodiment, the first measurement configuration includes the second threshold.

For example, the processing module 1401 is configured to determine a first timing offset, where the first timing offset is a slot offset of a first cell managed by a communication apparatus relative to a second cell managed by the communication apparatus. The transceiver module 1402 is configured to send the first timing offset to a second network element.

In an example embodiment, the communication apparatus is the master node MN, and the second network element is the secondary node SN; or the communication apparatus is the SN, and the second network element is the MN.

In an example embodiment, the transceiver module 1402 is further configured to send a semi-persistent transmission direction configuration of the first cell and/or a semi-persistent transmission direction configuration of the second cell to the second network element.

In an example embodiment, the first timing offset corresponds to a subcarrier spacing of the second cell.

In an example embodiment, the subcarrier spacing is a larger value of a first subcarrier spacing and a second subcarrier spacing. The first subcarrier spacing is a lowest subcarrier spacing in an uplink-downlink subcarrier spacing list in a serving cell configuration of a special serving cell in the communication apparatus of the terminal device, and the second subcarrier spacing is a lowest subcarrier spacing in an uplink-downlink subcarrier spacing list in a serving cell configuration of a secondary serving cell in the communication apparatus of the terminal device.

For example, the processing module 1401 is configured to determine first serving cell configuration information, where the first serving cell configuration information is identification information of all serving cells configured by the first network element for a terminal device. The transceiver module 1402 is configured to send the first serving cell configuration information to a second network element.

In an example embodiment, the communication apparatus is an MN, and the second network element is an SN; or the communication apparatus is an SN, and the second network element is an MN.

In an example embodiment, the transceiver module 1402 is further configured to send semi-persistent transmission direction configuration information of all cells (including a non-serving cell of the terminal device) managed by the first network element to the second network element.

In this embodiment, the communication apparatus 140 is presented in a form of function modules obtained through division in an integrated manner. The module herein may be an ASIC, a circuit, a processor that executes one or more software or firmware programs, a memory, an integrated logic circuit, and/or another component capable of providing the foregoing functions.

Specifically, a function/implementation process of the processing module 1401 in FIG. 14 may be implemented by a processor in the access network device by invoking computer-executable instructions stored in a memory. Alternatively, a function/implementation process of the transceiver module 1402 in FIG. 14 may be implemented via an RF circuit in the access network device.

Because the communication apparatus 140 provided in this embodiment may perform the foregoing method, for a technical effect that can be achieved by the communication apparatus 140, refer to the foregoing method embodiment. Details are not described herein again.

Figure 15:
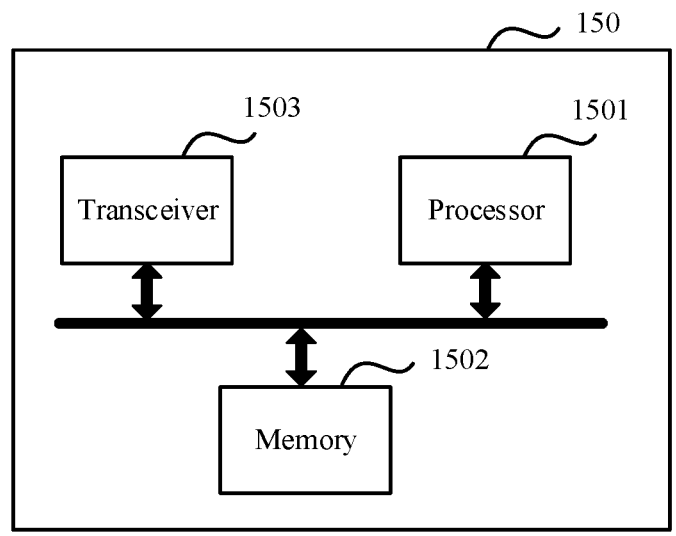
FIG. 15 is a schematic diagram of a structure of a communication apparatus according to an embodiment of this application.

As shown in FIG. 15, an embodiment of this application further provides a communication apparatus. The communication apparatus 150 includes a processor 1501, a memory 1502, and a transceiver 1503. The processor 1501 is coupled to the memory 1502. When the processor 1501 executes a computer program or instructions in the memory 1502, the methods corresponding to the terminal device in FIG. 6 to FIG. 9 are performed.

Figure 16:
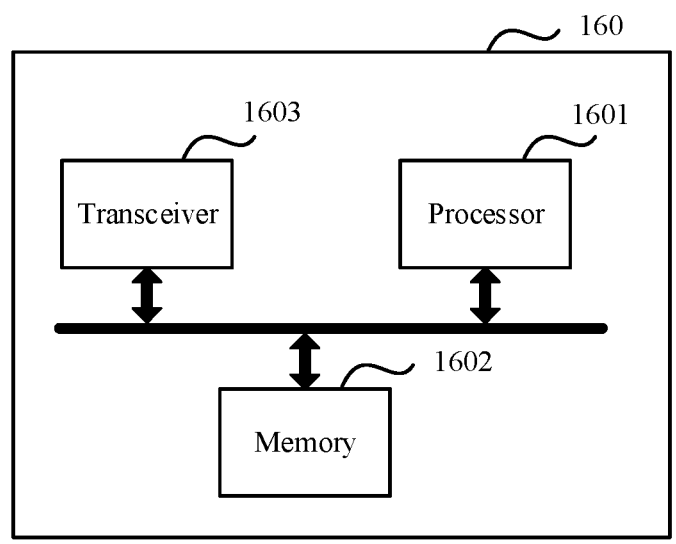
FIG. 16 is a schematic diagram of a structure of a communication apparatus according to an embodiment of this application.

As shown in FIG. 16, an embodiment of this application further provides a communication apparatus. The communication apparatus 160 includes a processor 1601, a memory 1602, and a transceiver 1603. The processor 1601 is coupled to the memory 1602. When the processor 1601 executes a computer program or instructions in the memory 1602, the methods corresponding to the first network element, the second network element, the MN, or the SN in FIG. 6 to FIG. 12 are performed.

An embodiment of this application further provides a computer-readable storage medium. The computer-readable storage medium stores a computer program. When the computer program runs on a computer or a processor, the computer or the processor is enabled to perform the methods corresponding to the terminal device in FIG. 6 to FIG. 9.

An embodiment of this application further provides a computer-readable storage medium. The computer-readable storage medium stores a computer program. When the computer program runs on a computer or a processor, the computer or the processor is enabled to perform the methods corresponding to the first network element, the second network element, the MN, or the SN in FIG. 6 to FIG. 12.

An embodiment of this application further provides a computer program product including instructions. When the instructions run on a computer or a processor, the computer or the processor is enabled to perform the methods corresponding to the terminal device in FIG. 6 to FIG. 9.

An embodiment of this application further provides a computer program product including instructions. When the instruction run on a computer or a processor, the computer or the processor is enabled to perform the methods corresponding to the first network element, the second network element, the MN, or the SN in FIG. 6 to FIG. 12.

An embodiment of this application provides a chip system. The chip system includes a processor, configured to perform, by a communication apparatus, the methods corresponding to the terminal device in FIG. 6 to FIG. 9, or perform the methods corresponding to the first network element, the second network element, the MN, or the SN in FIG. 6 to FIG. 12.

In an example embodiment, the chip system further includes a memory, and the memory is configured to store necessary program instructions and necessary data. The chip system may include a chip and an integrated circuit, or may include a chip and another discrete device. This is not specifically limited in this embodiment of this application.

The communication apparatus, the chip, the computer storage medium, the computer program product, or the chip system provided in this application are all configured to perform the foregoing method. Therefore, for beneficial effects that can be achieved by the communication apparatus, the chip, the computer storage medium, the computer program product, or the chip system, refer to beneficial effects in the foregoing embodiments. Details are not described herein again.

The processor in embodiments of this application may be a chip. For example, the processor may be a field programmable gate array (FPGA), an application-specific integrated chip (ASIC), a system on chip (SoC), a central processing unit (CPU), a network processor (NP), a digital signal processing circuit (digital signal processor, DSP), a micro controller unit (MCU), a programmable controller (programmable logic device, PLD), or another integrated chip.

The memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, device, and method may be implemented in other manners. For example, the described device embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The foregoing descriptions are merely example embodiments of this application, and are not intended to limit the protection scope of this application. Any variation or replacement readily figured out by a person skilled in the art within the technical scope disclosed in this application may fall within the protection scope of this application.

What is claimed is:

1. A measurement method, comprising:
   communicating, by a terminal device, with a plurality of access network devices via multi-radio dual connectivity (MR-DC) technology, wherein the plurality of access network devices include a master node (MN) managing a primary cell (PCell) and a secondary node (SN) managing a primary secondary cell (PSCell);
   receiving, by the terminal device, a first measurement configuration from the MN or the SN, wherein the first measurement configuration indicates that the terminal device is to measure at least one of:
      a target PCell frequency of a target PCell corresponding to a target MN; or
      a target PSCell frequency of a target PSCell corresponding to a target SN; and
   sending, by the terminal device, a measurement report to a first network element, wherein the measurement report comprises both of:
      a first measurement result corresponding to the target PCell frequency of the target PCell; and
      a second measurement result corresponding to the target PSCell frequency of the target PSCell;
   wherein the target PCell frequency and the target PSCell frequency satisfy a combination restriction for the target MN and the target SN.

2. The method according to claim 1, further comprising:
   receiving, by the terminal device, first indication information;
   wherein the first indication information indicates:
      identification information of the target PCell frequency or the target PSCell frequency; or
      information about a second measurement configuration that comprises the target PCell frequency or the target PSCell frequency.

3. The method according to claim 2, wherein the first indication information is comprised in the first measurement configuration.

4. The method according to claim 1, wherein the first measurement configuration indicates that the terminal device is to measure both of:
   the target PCell frequency of the target PCell corresponding to the target MN; and
   the target PSCell frequency of the target PSCell corresponding to the target SN.

5. The method according to claim 1, wherein the first measurement result comprises identification information of the target PCell or the target PSCell and a measurement result of the target PCell or the target PSCell, and the measurement result of the target PCell or the target PSCell is greater than a first threshold.

6. The method according to claim 5, wherein the first measurement configuration comprises the first threshold.

7. The method according to claim 1, wherein the second measurement result comprises a cell identifier of the target PCell or the target PSCell and a measurement result of the target PCell or the target PSCell, and the measurement result of the target PCell or the target PSCell is greater than a second threshold.

8. The method according to claim 7, wherein the first measurement configuration comprises the second threshold.

9. The method according to claim 1, wherein sending the measurement report to the first network element is based on the first measurement result being greater than a first threshold and the second measurement result being greater than a second threshold.

10. The method according to claim 9, wherein the first measurement configuration comprises the first threshold.

11. The method according to claim 9, wherein the first measurement configuration comprises the second threshold.

12. A terminal device, comprising:
   a transceiver configured to:
      communicate with a plurality of access network devices via multi-radio dual connectivity (MR-DC) technology, wherein the plurality of access network devices include a master node (MN) managing a primary cell (PCell) and a secondary node (SN) managing a primary secondary cell (PSCell); and
      receive a first measurement configuration from the MN or the SN;
   a processor configured to determine, based on the first measurement configuration, that the terminal device is to measure at least one of:
      a target PCell frequency of a target PCell corresponding to a target MN; or
      a target PSCell frequency of a target PSCell corresponding to a target SN;
   wherein the transceiver is further configured to send a measurement report to a first network element, wherein the measurement report comprises both of:
      a first measurement result corresponding to the target PCell frequency of the target PCell; and
      a second measurement result corresponding to the target PSCell frequency of the target PSCell;
   wherein the target PCell frequency and the target PSCell frequency satisfy a combination restriction for the target MN and the target SN.

13. The terminal device according to claim 12, wherein the transceiver is further configured to receive first indication information;
   wherein the first indication information indicates:
      identification information of the target PCell frequency or the target PSCell frequency; or
      information about a second measurement configuration that comprises the target PCell frequency or the target PSCell frequency.

14. The terminal device according to claim 13, wherein the first indication information is comprised in the first measurement configuration.

15. The terminal device according to claim 12, wherein the first measurement configuration indicates that the terminal device is to measure both of:

the target PCell frequency of the target PCell corresponding to the target MN; and the target PSCell frequency of the target PSCell corresponding to the target SN.

16. The terminal device according to claim 12, wherein the first measurement result comprises identification information of the target PCell or the target PSCell and a measurement result of the target PCell or the target PSCell, and the measurement result of the target PCell or the target PSCell is greater than a first threshold.

17. The terminal device according to claim 16, wherein the first measurement configuration comprises the first threshold.

18. The terminal device according to claim 12, wherein the second measurement result comprises a cell identifier of the target PCell or the target PSCell and a measurement result of the target PCell or the target PSCell, and the measurement result of the target PCell or the target PSCell is greater than a second threshold.

19. The terminal device according to claim 18, wherein the first measurement configuration comprises the second threshold.

20. A non-transitory computer-readable storage medium having processor-executable instructions stored thereon, wherein the processor-executable instructions, when executed, facilitate:

communicating, by a terminal device, with a plurality of access network devices via multi-radio dual connectivity (MR-DC) technology, wherein the plurality of access network devices include a master node (MN) managing a primary cell (PCell) and a secondary node (SN) managing a primary secondary cell (PSCell);

receiving, by the terminal device, a first measurement configuration from the MN or the SN, wherein the first measurement configuration indicates that the terminal device is to measure at least one of:
- a target PCell frequency of a target PCell corresponding to a target MN; or
- a target PSCell frequency of a target PSCell corresponding to a target SN; and sending, by the terminal device, a measurement report to a first network element, wherein the measurement report comprises both of:
- a first measurement result corresponding to the target PCell frequency of the target PCell; and
- a second measurement result corresponding to the target PSCell frequency of the target PSCell;

wherein the target PCell frequency and the target PSCell frequency satisfy a combination restriction for the target MN and the target SN.

* * * * *